(12) United States Patent
Saito et al.

(10) Patent No.: US 10,273,387 B2
(45) Date of Patent: *Apr. 30, 2019

(54) ADHESIVE SHEET

(71) Applicant: LINTEC CORPORATION, Itabashi-ku (JP)

(72) Inventors: Shigeru Saito, Ina (JP); Wataru Miyazaki, Kita-ku (JP); Kiichiro Kato, Saitama (JP); Kazue Uemura, Tsukubamirai (JP); Yumiko Amino, Funabashi (JP); Yasunari Takanashi, Chiba (JP)

(73) Assignee: LINTEC CORPORATION, Itabashi-ku (JP)

( * ) Notice: Subject to any disclaimer, the term of this patent is extended or adjusted under 35 U.S.C. 154(b) by 71 days.

This patent is subject to a terminal disclaimer.

(21) Appl. No.: 15/300,058

(22) PCT Filed: Apr. 2, 2015

(86) PCT No.: PCT/JP2015/060422
§ 371 (c)(1),
(2) Date: Sep. 28, 2016

(87) PCT Pub. No.: WO2015/152356
PCT Pub. Date: Oct. 8, 2015

(65) Prior Publication Data
US 2017/0174945 A1 Jun. 22, 2017

(30) Foreign Application Priority Data

Apr. 2, 2014 (JP) ................. 2014-076577
Apr. 2, 2014 (JP) ................. 2014-076579
Apr. 2, 2014 (JP) ................. 2014-076580

(51) Int. Cl.
*C09J 7/00* (2018.01)
*C09J 133/08* (2006.01)
(Continued)

(52) U.S. Cl.
CPC ............... *C09J 7/383* (2018.01); *B05D 1/36* (2013.01); *B05D 3/108* (2013.01); *B05D 5/00* (2013.01);
(Continued)

(58) Field of Classification Search
CPC ...... C09J 7/0217; C09J 11/04; C09J 2433/00; C09J 133/08; C09J 7/02; C09J 7/385;
(Continued)

(56) References Cited

U.S. PATENT DOCUMENTS 6,294,250 B1 9/2001 Date
9,240,131 B2 * 1/2016 Onderisin .............. B31D 1/027
(Continued)

FOREIGN PATENT DOCUMENTS

DE 10 2008 026 951 A1 12/2009
EP 0 279 579 A1 8/1988
(Continued)

OTHER PUBLICATIONS

International Search Report dated Jul. 7, 2015 in PCT/JP2015/060422, filed Apr. 2, 2015.

*Primary Examiner* — Patricia L. Nordmeyer
(74) *Attorney, Agent, or Firm* — Oblon, McClelland, Maier & Neustadt, L.L.P.

(57) ABSTRACT

Provided is a pressure sensitive adhesive sheet having a resin layer on a substrate or a release material, at least a surface (α) of the resin layer being opposite to the side thereof on which the substrate or the release material is provided has pressure sensitive adhesiveness, wherein one or more concave portions exist on the surface (α), and a standard deviation (σ) based on a mean brightness value of the surface (α) is 10.0 or more. When attached to an adherend, the pressure sensitive adhesive sheet can readily remove air accumulation to be formed and therefore exhibits excellent air escape property, and has good pressure sensitive adhesion characteristics.

20 Claims, 6 Drawing Sheets

(51) Int. Cl.

| | | |
|---|---|---|
| *C09J 7/38* | (2018.01) | |
| *C09J 201/00* | (2006.01) | |
| *C09J 7/02* | (2006.01) | |
| *B05D 1/36* | (2006.01) | |
| *B05D 3/10* | (2006.01) | |
| *B05D 5/00* | (2006.01) | |
| *C09J 11/04* | (2006.01) | |
| *C08K 3/34* | (2006.01) | |
| *C09J 5/00* | (2006.01) | |
| *C09J 7/22* | (2018.01) | |
| *C09J 7/20* | (2018.01) | |
| *C09J 7/25* | (2018.01) | |
| *C09J 7/10* | (2018.01) | |
| *C09J 121/00* | (2006.01) | |
| *C09J 167/00* | (2006.01) | |
| *C09J 175/04* | (2006.01) | |
| *C08K 3/013* | (2018.01) | |
| *C08K 3/36* | (2006.01) | |
| *C08K 7/00* | (2006.01) | |

(52) U.S. Cl.
CPC .............. *C08K 3/34* (2013.01); *C09J 5/00* (2013.01); *C09J 7/026* (2013.01); *C09J 7/0207* (2013.01); *C09J 7/0217* (2013.01); *C09J 7/0253* (2013.01); *C09J 7/0285* (2013.01); *C09J 7/10* (2018.01); *C09J 7/203* (2018.01); *C09J 7/22* (2018.01); *C09J 7/255* (2018.01); *C09J 7/38* (2018.01); *C09J 7/385* (2018.01); *C09J 11/04* (2013.01); *C09J 121/00* (2013.01); *C09J 133/08* (2013.01); *C09J 167/00* (2013.01); *C09J 175/04* (2013.01); *C09J 201/00* (2013.01); *C08K 3/013* (2018.01); *C08K 3/346* (2013.01); *C08K 3/36* (2013.01); *C08K 7/00* (2013.01); *C08K 2201/003* (2013.01); *C09J 7/02* (2013.01); *C09J 7/20* (2018.01); *C09J 2201/16* (2013.01); *C09J 2201/28* (2013.01); *C09J 2201/36* (2013.01); *C09J 2201/606* (2013.01); *C09J 2205/10* (2013.01); *C09J 2205/102* (2013.01); *C09J 2205/114* (2013.01); *C09J 2400/163* (2013.01); *C09J 2421/00* (2013.01); *C09J 2433/00* (2013.01); *C09J 2467/006* (2013.01); *C09J 2475/00* (2013.01); *C09J 2483/005* (2013.01)

(58) Field of Classification Search
CPC ..... C09J 7/255; C09J 7/203; C09J 7/22; C09J 7/38; C09J 7/10; C09J 7/0207; C09J 7/0253; C09J 7/026; C09J 7/0285; C09J 7/20; C09J 2201/606; C09J 2201/28; C09J 2205/102; C09J 5/00; C09J 201/00; C09J 2201/003; C09J 2201/16; C09J 2201/36; C09J 2205/10; C09J 2205/114; C09J 2400/163; C09J 2421/00; C09J 2467/006; C09J 2475/00; C09J 2483/005; B05D 1/36; B05D 3/108; B05D 5/00; C08K 3/346; C08K 3/36; C08K 3/34; C08K 3/013; C08K 7/00; C08K 2201/003
See application file for complete search history.

(56) References Cited

U.S. PATENT DOCUMENTS

| | | |
|---|---|---|
| 2001/0051264 A1 | 12/2001 | Mazurek et al. |
| 2007/0004065 A1 | 1/2007 | Schardt et al. |
| 2007/0212964 A1 | 9/2007 | Massow et al. |
| 2007/0275203 A1 | 11/2007 | Ludwig |
| 2009/0047500 A1 | 2/2009 | Maeda |
| 2010/0092730 A1 | 4/2010 | Tomino et al. |
| 2010/0209671 A1 | 8/2010 | Kato |
| 2011/0014462 A1 | 1/2011 | Kanda |
| 2013/0011670 A1 | 1/2013 | Tsubaki et al. |
| 2015/0247064 A1 | 9/2015 | Kato et al. |

FOREIGN PATENT DOCUMENTS

| | | |
|---|---|---|
| EP | 3 127 978 A1 | 2/2017 |
| EP | 3 127 982 A1 | 2/2017 |
| JP | 7-53930 A | 2/1995 |
| JP | 2001-507732 A | 6/2001 |
| JP | 2002-275433 A | 9/2002 |
| JP | 2004-115766 A1 | 4/2004 |
| JP | 2006-130672 A | 5/2006 |
| JP | 2008-150431 A | 7/2008 |
| JP | 2009-35609 A | 2/2009 |
| JP | 2009-231413 A | 10/2009 |
| JP | 2010-106239 A | 5/2010 |
| JP | 2011-12198 A | 1/2011 |
| JP | 2011-236370 A | 11/2011 |
| JP | 2012-136717 A | 7/2012 |
| JP | 2012-197332 A | 10/2012 |
| JP | 2012-201877 A | 10/2012 |
| JP | 2013-18163 A | 1/2013 |
| WO | WO 98/08909 A1 | 3/1998 |
| WO | WO 2007/079919 A1 | 7/2007 |

* cited by examiner (a)

(b)

(a)

(b)

(a)

(b)

ADHESIVE SHEET

TECHNICAL FIELD

The present invention relates to a pressure sensitive adhesive sheet.

BACKGROUND ART

A general pressure sensitive adhesive sheet is constituted by a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by making the pressure sensitive adhesive layer into contact therewith.

A pressure sensitive adhesive sheet having a large attaching area, which may be used for identification or decoration, masking for painting, surface protection of a metal plate or the like, and the like, has a problem that on attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a particular shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, the pressure sensitive adhesive sheet having a pressure sensitive adhesive layer having grooves with a particular shape, which is general, disposed in a prescribed pattern, as shown in PTL 1, has a problem that when the width of the grooves is small, it is difficult to vent the air, and when the width of the grooves is large, not only the surface of the substrate is dented to deteriorate the appearance, but also the pressure sensitive adhesive strength is lowered.

In the pressure sensitive adhesive sheet, the grooves disposed in a prescribed pattern deteriorate the pressure sensitive adhesive strength locally in the portion having the grooves disposed, and after attaching the pressure sensitive adhesive sheet to an adherend, there is a possibility that the sheet is detached therefrom in the portion.

In the case where the pressure sensitive adhesive sheet is attached to an adherend and then peeled again therefrom, there is a possibility of adhesive deposits remaining on the adherend depending on the peeling direction of the pressure sensitive adhesive sheet since the pressure sensitive adhesion characteristics of the pressure sensitive adhesive sheet varies locally. For example, in the case where the pressure sensitive adhesive sheet having the pressure sensitive adhesive layer wherein the grooves of a lattice pattern is disposed is peeled obliquely, there is a possibility of adhesive deposits remaining on the adherend.

Furthermore, in the case where the pressure sensitive adhesive sheet is punched out, there is a possibility that the disposition pattern of the grooves overlaps the punching pattern In this case, the cutting depth may fluctuate to provide a problem that a cut line cannot be suitably formed in the pressure sensitive adhesive sheet, In general, such a process step of forming a trigger for peeling in order to facilitate the peeling of the release material (i.e., a so-called back slit) by only cutting a release material provided on the pressure sensitive adhesive sheet may be performed. In the case where the above step is performed, it is the general procedure that the release material is once peeled off from the pressure sensitive adhesive sheet, and after putting notches in the release material, the release material and the pressure sensitive adhesive layer of the pressure sensitive adhesive sheet are again laminated with each other.

In the pressure sensitive adhesive sheet described in PTL 1, however, due to the use of an embossed liner as the release material, it is necessary to provide a separate release material that is not embossed. Because, it is difficult to follow to the emboss pattern of the release material when laminating again the release material and the pressure sensitive adhesive layer.

In PTL 1, further, for forming a minute structure in the pressure sensitive adhesive layer, such a method is used that the pressure sensitive adhesive layer is once formed by coating a pressure sensitive adhesive on the embossed liner, and then the pressure sensitive adhesive layer and a substrate are laminated (i.e., a so-called transfer coating method). However, in the case where a substrate having a surface with low polarity, such as a polyolefin substrate, is used, sufficient adhesiveness cannot be obtained between the substrate and the pressure sensitive adhesive layer by the method.

Moreover, as different from a release material formed of paper, a release material formed of a resin film is difficult to form a fine emboss pattern to a pressure sensitive adhesive layer.

An object of the present invention is to provide a pressure sensitive adhesive sheet that has an excellent air escape property capable of easily removing air accumulation that may be formed on attaching to an adherend, and is excellent in pressure sensitive adhesion characteristics.

Solution to Problem

The present inventors have found that a pressure sensitive adhesive sheet having a resin layer having one or more concave portion on the pressure sensitive adhesive surface of the resin layer, in which a standard deviation ($\sigma$) base on a mean brightness value of the surface is a predetermined value or more, can solve the above-mentioned problems, and thereby have completed the present invention.

Specifically, the present invention provides the following [1] to [22].

[1] A pressure sensitive adhesive sheet having a resin layer on a substrate or a release material, at least a surface ($\alpha$) of the resin layer being opposite to the side thereof on which the substrate or the release material is provided having pressure sensitive adhesiveness, wherein one or more concave portions exist on the surface (α), and a standard deviation (σ) based on a mean brightness value of the surface (α) is 10.0 or more.

[2] The pressure sensitive adhesive sheet according to the above [1], wherein the one or more concave portions are not formed by transferring an emboss pattern.

[3] The pressure sensitive adhesive sheet according to the above [1] or [2], wherein shapes of the one or more concave portions have irregular shapes.

[4] The pressure sensitive adhesive sheet according to any one of the above [1] to [3], wherein the one or more concave portions are formed through self-formation of the resin layer.

[5] The pressure sensitive adhesive sheet according to any one of the above [1] to [4], wherein the one or more concave portions have a maximum height difference of 0.5 μm or more.

[6] The pressure sensitive adhesive sheet according to any one of the above [1] to [5], wherein one or more of the concave portions exist in a region (Q) surrounded by an arbitrarily selected square having an edge length of 1 mm on the surface (α).

[7] The pressure sensitive adhesive sheet according to any one of the above [1] to [6], wherein plural concave portions exist on the surface (α) of the resin layer and 95% or more of the plural concave portions each have a different shape.

[8] The pressure sensitive adhesive sheet according to any one of the above [1] to [7], wherein plural concave portions exist on the surface (α) of the resin layer and the positions of the plural concave portions do not have periodicity.

[9] The pressure sensitive adhesive sheet according to any one of the above [1] to [8], wherein the resin layer contains a resin part (X) containing a resin as a main component and a particle part (Y) consisting of fine particles.

[10] The pressure sensitive adhesive sheet according to any one of the above [9], wherein the mass retention rate after heating the resin layer at 800° C. for 30 minutes is 3 to 90% by mass.

[11] The pressure sensitive adhesive sheet according to the above [9] or [10], wherein the resin contained in the resin part (X) contains a pressure sensitive adhesive resin.

[12] The pressure sensitive adhesive sheet according to any one of the above [9] to [11], wherein the resin part (X) further contains at least one or more selected from a metal chelate crosslinking agent and an epoxy crosslinking agent.

[13] The pressure sensitive adhesive sheet according to any one of the above [9] to [12], wherein the fine particles are one or snore selected from silica particles, metal oxide particles and smectite.

[14] The pressure sensitive adhesive sheet according to any one of the above [1] to [13], wherein the surface (β) of the resin layer on the side on which the substrate or the release material is provided has pressure sensitive adhesiveness.

[15] The pressure sensitive adhesive sheet according to the above [14], which has the resin layer on the release material.

[16] The pressure sensitive adhesive sheet according to any one of the above [1] to [15], wherein the resin layer has a multi-layer structure containing a layer (Xβ) mainly containing the resin part (X), a layer (Y1) containing the particle part (Y) in an amount of 15% by mass or more, and a layer (Xα) mainly containing the resin part (X), as laminated in this order from the side on which the substrate or the release material is provided.

[17] The pressure sensitive adhesive sheet according to the above [16], wherein:

the layer (Xβ) is a layer formed by a composition (xβ) containing the resin as a main component.

the layer (Y1) is a layer formed by a composition (y) containing the fine particles in an amount of 15% by mass or more, and the layer (Xα) is a layer formed of a composition (xα) containing a resin as a main component.

[18] A method for producing a pressure sensitive adhesive sheet according to any one of the above [1] to [15], which includes at least the following steps (1) and (2):

step (1): a step of forming a coating film (x') formed by a composition (x) containing the resin as a main component, and a coating film (y') formed by a composition (y) containing the fine particles in an amount of 15% by mass or more; and step (2): a step of drying the coating film (x') and the coating film (y') formed in the step (1) simultaneously.

[19] A method for producing a pressure sensitive adhesive sheet according to the above [17], which includes at least the following steps (1A) and (2A):

step (1A): a step of forming, on a substrate or a release material, a coating film (xβ') formed by the composition (xβ) containing the resin as a main component, a coating film (y') formed by the composition (y) containing the fine particles in an amount of 15% by mass or more and a coating film (xα') formed by the a composition (xα) containing the resin as a main component, by laminating in this order; and step (2A): a step of drying the coating film (xβ'), the coating (y') and the coating film (xα') formed in the step (1A) simultaneously.

[20] A method for producing a pressure sensitive adhesive sheet according to the above [17], which includes at least the following steps (1B) and (2B):

step (1B): a step of forming, on the layer (Xβ) mainly containing a resin part (X) that is provided on a substrate or a release material, a coating film (y') formed by the composition (y) containing the fine particles in an amount of 15% by mass or more and a coating film (xα') formed by the composition (xα) containing the resin as a main component, by laminating in this order; and step (2B): a step of drying the coating film (y') and the coating film (xα') formed in the step (1B) simultaneously.

[21] A viscoelastic layer containing a resin, wherein:

one or more concave portions exist on at least one surface thereof, and a standard deviation (σ) based on a mean brightness value of the surface having the one or more concave portion thereon is 10.0 or more.

[22] The viscoelastic layer according to the above [21], wherein the viscoelastic layer contains a resin part (X) containing a resin as a main component and a particle part (Y) consisting of fine particles.

Advantageous Effects of Invention

The pressure sensitive adhesive sheet of the present invention has excellent air escape property capable of readily removing air accumulation that may be formed on attaching to an adherend, and has good pressure sensitive adhesion characteristics.

DESCRIPTION OF EMBODIMENTS

Figure 1:
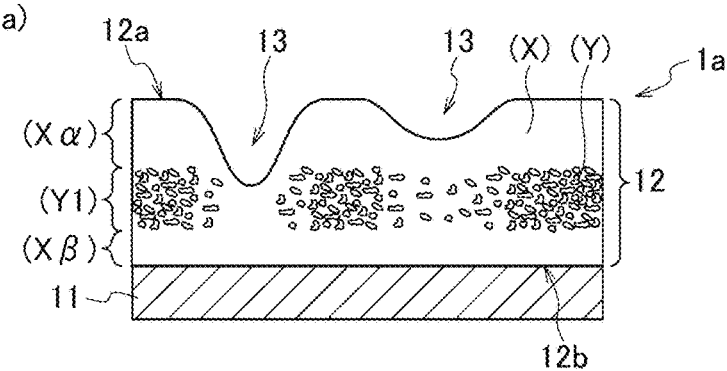
FIG. 1 is a schematic cross sectional view showing an example of the structure of the pressure sensitive adhesive sheet of the present invention.
Figure 1:
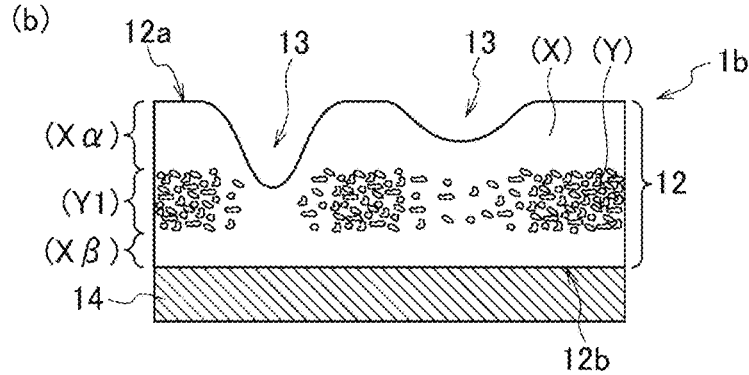
Figure 1:
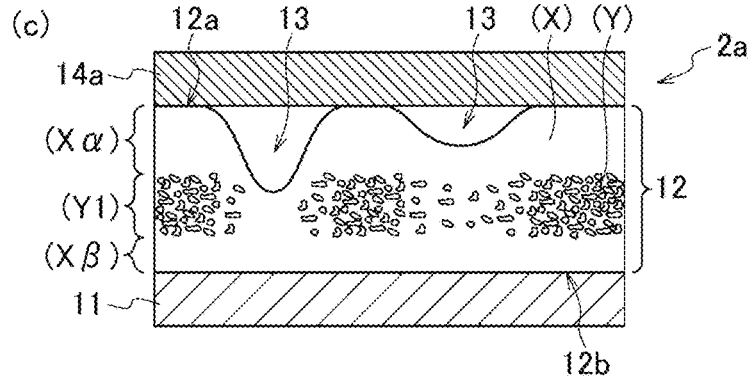
Figure 1:
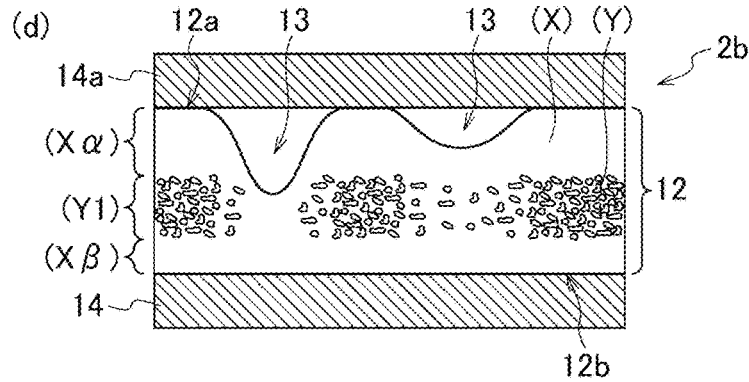

In the present invention, for example, an expression "YY containing a component XX as a main component" or an expression "YY mainly containing a component XX" means that "among the components contained in YY, a component having a largest content is the component XX". A concrete content of the component XX in this expression is generally 50% by mass or more, and is preferably 65 to 100% by mass, more preferably 75 to 100% by mass, even more preferably 85 to 100% by mass, relative to the total amount (100% by mass) of YY.

In the present invention, for example, "(meth)acrylic acid" indicates both "acrylic acid" and "methacrylic acid", and the same shall apply to other similarity terms.

Regarding a preferred numerical range (for example, a range of content or the like), a lower limit and an upper limit that are expressed in stages can be combined each independently. For example, from an expression of "preferably 10 to 90, more preferably 30 to 60", "the preferred lower limit (10)" and "the preferred upper limit (60)" may be combined to be "10 to 60".

[Configuration of Pressure Sensitive Adhesive Sheet]

First, the configuration of the pressure sensitive adhesive sheet of the present invention is described.

The pressure sensitive adhesive sheet of the present invention has a resin layer on a substrate or a release material, at least a surface (α) of the resin layer opposite to the side thereof on which the substrate or the release material is provided having pressure sensitive adhesiveness, in which one or more concave portions exist on the surface (α) and a standard deviation (σ) based on a mean brightness value of the surface (α) is 10.0 or more.

FIG. 1 includes schematic cross-sectional views of pressure sensitive adhesive sheets, showing examples of a configuration of the pressure sensitive adhesive sheet of the present invention.

As specific configurations of a pressure sensitive adhesive sheet that are embodiments of the present invention, for example, there are mentioned a pressure sensitive adhesive sheet 1a having a resin layer 12 on a substrate 11 as shown by FIG. 1(a), and a pressure sensitive adhesive sheet 1b having a resin layer 12 on a release material 14 as shown by FIG. 1(b).

In the pressure sensitive adhesive sheet of the present invention, at least a surface (α) 12a of the resin layer 12 on the side opposite to the side on which the substrate 11 or the release material 14 is provided (hereinafter this may be simply referred to as "surface (α)") has pressure sensitive adhesiveness.

Accordingly, from the viewpoint of handleability, the pressure sensitive adhesive sheet of the embodiment of the present invention preferably has a configuration of a pressure sensitive adhesive sheet 2a or 2b as shown by FIG. 1 (c) or FIG. 1 (d), where a release material 14a is further arranged on the surface (α) 12a of the resin layer 12 in the pressure sensitive adhesive sheet 1a or 1b shown in FIG. 1.

In the pressure sensitive adhesive sheet of the embodiment of the present invention, the surface (β) 12b of the resin layer 12 on the side which the substrate 11 or the release material 14 is provided (hereinafter this may be simply referred to as "surface (β)") may also have pressure sensitive adhesiveness. When the surface (β) also has pressure sensitive adhesiveness, in the pressure sensitive adhesive sheet 1a or 2a shown by FIG. 1 (a) or FIG. 1 (c), the adhesion between the resin layer 12 and the substrate 11 can be good, and the pressure sensitive adhesive sheet 1b or 2b shown by FIG. 1 (b) or FIG. (d) may be a double-sided pressure sensitive adhesive sheet.

The resin layer 12 that the pressure sensitive adhesive sheet of the present invention has preferably contains a resin part (X) containing a resin as a main component, and a particle part (Y) consisting of fine particles.

Since the resin layer contains the particle part (Y), the resultant pressure sensitive adhesive sheet can effectively prevent formation of blisters when used at high temperatures.

Regarding the distribution pattern of the resin part (X) and the particle part (Y) in the resin layer 12, the resin parts (X) and the particle parts (Y) may be distributed almost evenly as one pattern, or as a different pattern, an area mainly containing the resin parts (X) and an area mainly containing the particle parts (Y) may be locally divided.

In addition, as shown by FIG. 1 (a) to FIG. 1 (d), in the area where the concave portions 13 exist on the surface (α) of the resin layer 12, the pattern may be such that the proportion of the particle parts (Y) is smaller than in the other areas, or the particle parts (Y) may not be partly present.

As shown in FIG. 1 (a) to FIG. 1 (d), the pressure sensitive adhesive sheet of the present invention has concave portions 13 existing on the surface (α) 12a of the resin layer 12 therein.

The concave portions 13 existing on the surface (α) play a role of air-discharge channels for removing outside the "air accumulation" to be formed in adhering the surface (α) of the resin layer of the pressure sensitive adhesive sheet of the present invention to an adherend.

The length of the concave portions 13 in a planar view of the concave portions 13 existing on the surface (α) is not specifically limited. Namely, the concave portions 13 includes a relatively long groove-like one and a relatively short pit-like one.

In the pressure sensitive adhesive sheet of the present invention, the standard deviation (σ) based on the mean brightness value of the surface (α) must be 10.0 or more.

When the shapes of the one or more concave portions existing on the surface (α) and the existing positions thereof vary more widely, the value of the standard deviation (σ) tends to increase more. Namely, based on the value of the standard deviation (σ) regarding the one or more concave portions existing on the surface (α), it is possible to comprehend the degree of fluctuation of the shapes of the one or more concave portions and the existing positions of the one or more concave portions.

The value of standard deviation (σ) based on the mean brightness value of the surface of the pressure sensitive adhesive layer having grooves formed thereon through ordinarily-planed embossed pattern transfer tends to be relatively small. This is because the grooves existing on the surface have shapes having a predesigned width and length, and a predetermined number of such grooves are arranged on the surface in a predetermined pattern, in which therefore the fluctuation of the shapes of the grooves, and the width, the length, the number and the existing positions thereof is small.

However, a pressure sensitive adhesive sheet having grooves formed through such embossed pattern transfer hardly improve various characteristics, such as air escape property, appearance, pressure sensitive adhesion characteristics and punching property, in a well-balanced manner.

According to the present inventors' investigations, for example, when the shapes of grooves contributing toward improvement of air escape property and the shapes of grooves contributing toward improvement of pressure sensitive adhesion characteristics are compared, it is known that the shapes of the grooves required for improving these characteristics differ from each other.

With that, the present inventors have specifically noted the value of standard deviation (σ) based on the mean brightness value of the surface (α) as an index of indicating the degree of fluctuation of the shapes of the one or more concave portions existing on the surface (α) and the positions at which the one or more concave portions exist. As a result, the present inventors have found that when the standard deviation (σ) is 10.0 or more, a pressure sensitive adhesive sheet having well-balanced characteristics can be provided, and have completed the present invention.

In one embodiment of the pressure sensitive adhesive sheet of the present invention, the standard deviation (σ) based on the mean brightness value of the surface (α) is, from the viewpoint of providing a pressure sensitive adhesive sheet having well-balanced characteristics of air escape property and pressure sensitive adhesion characteristics, preferably 25.0 or more, more preferably 30.0 or more, even more preferably 35.0 or more, still more preferably 40.0 or more.

The upper limit of the standard deviation (σ) based on the mean brightness value of the surface (α) is not specifically limited, but the standard deviation (σ) is preferably 100.0 or less, more preferably 80.0 or less.

In the present invention, the value of the "standard deviation (σ) based on the mean brightness value of the surface (α)" means the value measured according to the following operations (i) to (iii), and concretely means the value measured according to the method described in the section of Examples.

Operation (i): Using an electron microscope (magnification: 30 to 100), a photographic picture of the surface (α) is taken in a planar view or in a perspective view at a shooting angle of 50 degrees or less. With that, a region (S) surrounded by a square having an edge length of 3 mm, which is arbitrarily selected on the surface (α) of the image, is defined.

Operation (ii): On the square image in the region (S) defined in the operation (i), the brightness values at different positions along one diagonal line of the square are plotted to prepare a line profile. Based on the line profile, the mean brightness and the standard deviation (σ) based on the mean brightness are calculated.

Operation (iii): On the square image in the region (S) defined in the operation line profiles are also prepared on the "other diagonal line" of the square and the "two straight lines passing through the intersection of the two diagonal lines and individually parallel to the vertical side and the horizontal side of the square", totaling 3 lines, like the operation (ii), and the mean brightness and the standard deviation (σ) based on the mean brightness are calculated. A mean value of the values of the standard deviation (σ) based on the mean brightness on the four straight lines is referred to as "standard deviation (σ) based on the mean brightness value of the surface (α)" f the resin layer of the targeted pressure sensitive adhesive sheet.

In one embodiment of the present invention, it is desirable from the viewpoint of controlling the standard deviation (σ) based on the mean brightness value of the surface (α) to fall within the above range, that the one or more concave portions existing on the surface (α) of the resin layer are not formed by transferring an emboss pattern.

Also in one embodiment of the present invention, it is desirable from the viewpoint of controlling the standard deviation (σ) based on the mean brightness value of the surface (α) to fall within the above range, that the shapes of the one or more concave portions have irregular shapes.

Here, the wording "the shapes of the one or more concave portions have irregular shapes" means that in a planar view or a stereoscopic view of the shape of the concave portion, the shapes of the one or more concave portions do not have any specific form such as a form surrounded by a circle or a line alone (triangle, square, etc.) but has an irregular form with no similarities between the shapes of the individual concave portions.

When the shapes of the concave portions have irregular shapes, the value of the standard deviation (σ)based on the mean brightness value of the surface (α) is large, therefore providing a pressure sensitive adhesive sheet having well-balanced characteristics of air escape property and pressure sensitive adhesion characteristics.

For the judgement whether or not the shapes of the one or more concave portions on the surface (α) have irregular shapes, in principle, the shapes of the one or more concave portions are observed three-dimensionally and visually or through a digital microscope (magnification: 30 to 100). In a planar view from the side of the surface (α) of the concave portions, when the planar shape of the concave portion is identified to have an irregular shape, it may be considered that the "shape of the concave portion has an irregular shape".

However, when ten regions (R) each surrounded by an arbitrarily selected square having an edge length of 4 mm on the surface (α) are selected, and the shapes of the one or more concave portions existing in each region (R) are observed visually or with a digital microscope (magnification: 30 to 100) in a planar view (if desired, in a stereoscopic view) from the side of the surface (α), and when the shapes of the one or more concave portions existing in each of those 10 selected regions are judged to have irregular shapes under the condition, it may also be considered that "the shapes of the one or more concave portions existing on the surface (α) of the resin layer have irregular shapes".

In the case where the region (R) is larger than a photographable region with a digital microscope, plural images taken in the neighboring photographable regions are combined to be one image of the region (R), which may be used for the above judgement.

In this description as the digital microscope for observation of various shapes, for example, "Digital Microscope VHX-1000" or "Digital Microscope VHX-5000", both trade names manufactured by Keyence Corporation may be used.

From the viewpoint of providing a pressure sensitive adhesive sheet having improved air escape property, it is desirable that the irregular shape of the one or more concave portion can be visually recognized from the side of the exposed surface (α) of the resin layer by observing with the naked eyes. In the pressure sensitive adhesive sheet 2a or 2b where the release material 14a is further provided on the surface (α) 12a of the resin layer 12, as shown in FIG. 1 (c) or FIG. 1 (d), it is desirable that, when the release material 14a is peeled away, such irregular shapes of the concave portions can be visually recognized from the side of the exposed surface (α).

Preferably, the one or more concave portions are formed through self-formation of the resin layer.

In the present invention, "self-formation" means a phenomenon of naturally forming a disorganized profile in a process of self-sustaining formation of a resin layer, and more precisely, means a phenomenon of naturally forming a disorganized profile in a process of self-sustaining formation of a resin layer by drying a coating film formed of a composition that s a forming material for a resin layer.

The shapes of the one or more concave portions thus formed through self-formation of the resin layer in the manner as above may be controlled in some degree by controlling the drying condition or the kind and the content of the component in the composition that is a forming material for the resin layer, but differ from grooves to be formed through embossed pattern transfer, and it may be said that "it is substantially impossible to reproduce exactly the same shapes". Consequently, it may be said that the one or more concave portions formed through self-formation of the resin layer could have irregular shapes.

Accordingly, the value of the standard deviation (σ) based on the mean brightness value of the surface (α) can be increased to provide a pressure sensitive adhesive sheet having well-balanced characteristics of air escape property and pressure sensitive adhesion characteristics.

The process of forming one or more concave portions through self-formation of the resin layer is considered to be as follows.

First, during formation of a coating film containing a composition that is a forming material for the resin layer, contraction stress occurs inside the coating film in the step of drying the coating film, and in the part where the resin bonding force is weakened, the coating film cracks. With that, it is considered that the resin around the cracked part may flow into the space temporarily formed by cracking to thereby form one or more concave portions on the surface (α) of the resin layer.

It is considered that, after two layers of the coating film each having a different resin content have been formed, by drying the two layers of the coating film simultaneously, a contraction stress difference is provided inside the coating film being dried, thereby facilitating the cracking of the coating film.

From the viewpoint of readily forming the one or more concave portions, it is recommended to control the condition appropriately in consideration of the following matters. It is considered that these matters could react with each other in a complex form to facilitate the formation of the one or more concave portions. In this connection, preferred embodiments of the matters for facilitating the formation of the one or more concave portions are as described in the corresponding sections to be given hereinunder.

The kind, constituent monomers, molecular weight and content of the resin contained in the composition of the forming material for the coating film.

The kind of the crosslinking agent and the kind of the solvent contained in the composition of the forming material for the coating film.

The viscosity and the solid concentration of the composition of the forming material for the coating film.

The thickness of the coating film to be formed (when plural layers are formed, the thickness of each coating film).

The drying temperature and the drying time for the formed coating film.

In formation of the pressure sensitive adhesive layer in an ordinary pressure sensitive adhesive sheet, it is intended to form the pressure sensitive adhesive layer having a flat surface, and the above-mentioned matters are suitably settled in many cases.

On the other hand, in the present invention, the above matters are so settled that the one or more concave portions capable of contributing toward improvement of the air escape property of the pressure sensitive adhesive sheet can be formed, quite differing from those in the planning method for the pressure sensitive adhesive layer of ordinary pressure sensitive adhesive sheets.

Preferably, the above-mentioned matters are suitably settled in consideration of the flowability of the resin contained in the coating film to be formed.

For example, in the case where the composition contains fine particles, by controlling the viscosity of the coating film formed of the composition containing a large amount of fine particles to fall within a suitable range, it is possible to suitably prevent the formed coating film from being mixed with any other coating film (a coating film containing a large amount of resin) while the predetermined flowability of the fine particles in the coating film could be maintained as such. By such controlling, cracks could be readily formed in the horizontal direction to facilitate formation of one or more concave portions in the coating film containing a large amount of resin.

As a result, it may be possible to increase the proportion of the one or more concave portions to be formed on the surface (α) and to increase the proportion of the one or more concave portions connecting to each other, thereby giving a pressure sensitive adhesive sheet having a more superior air escape property Among the above-mentioned matters, it is desirable to suitably control the kind, the constituent monomers and the molecular weight of the resin and the resin content so that the resin contained in the coating film containing a large amount of resin could have a suitable viscoelasticity.

Namely, by suitably increasing the hardness of the coating film (the hardness thereof that may be determined various factors such as the viscoelasticity of resin, the viscosity of the coating liquid, etc.), the contract stress of the resin part (X) increases to facilitate the formation of one or more concave portions. When the hardness of the coating film is higher, the contraction stress could be higher to facilitate the formation of one or more concave portions, but when the coating film is too hard, the coatability thereof may worsen. In addition, when the resin elasticity is increased too much, the adhesive strength of the resin layer to be formed from the coating film tends to lower. In consideration of these, it is desirable to suitably control the viscoelasticity of the resin.

In the case where the composition or the coating film contains fine particles, by suitably selecting the fine particles and the resin to thereby make the dispersion condition of the fine particles appropriate, the degree of swelling of the thickness of the resin layer owing to the fine particles therein and the self-forming power of the one or more concave portions could be thereby controlled and, as a result, the one or more concave portions could be readily formed on the surface ($\alpha$).

Further, in consideration of the crosslinking speed of the formed coating film (or the composition of the forming material), it is desirable that the above-mentioned matters are suitably settled.

Namely, in the case where the crosslinking speed of the coating film is too high, the coating film would be cured before formation of one or more concave portions therein. In addition, in the case, there may be some influences on the degree of cracking of the coating film.

The crosslinking speed of the coating film may be controlled by suitably defining the kind of the crosslinking agent and the kind of the solvent in the composition of the forming material or by suitably settling the drying time and the drying temperature for the coating film.

It is desirable that the one or more concave portions existing on the surface ($\alpha$) of the resin layer that the pressure sensitive adhesive sheet of the present invention has do not have a predetermined pattern. Here, "predetermined pattern" means, when a shape of one concave portion is noted, the shape to be a certain repeating unit that the concave portion has.

In one embodiment of the pressure sensitive adhesive sheet of the present invention, it is desirable that the above-mentioned one or more concave portions having irregular shapes exist in a region (T) surrounded by an arbitrarily selected square having an edge length of 10 mm on the surface ($\alpha$) of the resin layer, and more preferably the above-mentioned one or more concave portions having irregular shapes exist in a region (P) surrounded by an arbitrarily selected square having an edge length of 5 mm on the surface ($\alpha$) of the resin layer, even more preferably the above-mentioned one or more concave portions having irregular shapes exist in a region (R) surrounded by an arbitrarily selected square having an edge length of 4 mm on the surface ($\alpha$) of the resin layer, still more preferably the above-mentioned one or more concave portions having irregular shapes exist in a region (S) surrounded by an arbitrarily selected square having an edge length of 3 mm on the surface ($\alpha$) of the resin layer, and further more preferably the above-mentioned one or more concave portions having irregular shapes exist in a region (Q) surrounded by an arbitrarily selected square having an edge length of 1 mm on the surface ($\alpha$) of the resin layer.

Preferably, the one or more concave portions have a maximum height difference of 0.5 µm or more.

When the above-mentioned one or more concave portions having irregular shapes exist n a narrow region, naturally it may be considered that the one or more concave portions could exist in any other region broader than the region. For example, when the presence of the one or more concave portions in the region (Q) can be confirmed, it may be considered that the one or more concave portions could exist also in any other broader region than the region (Q), that is, the region (T), (P), (R) or (S).

In one embodiment of the present invention, the number of the concave portions existing in the arbitrarily selected region (P), (Q), (R), (S) or (T) on the surface ($\alpha$) is, from the viewpoint of providing a pressure sensitive adhesive sheet having improved air escape property, preferably 2 or more, more preferably 3 or more, but on the other hand, from the viewpoint of keeping the good appearance and pressure sensitive adhesion characteristics of the pressure sensitive adhesive sheet, the number is preferably 1000 or less, more preferably 500 or less.

In this description, one or more concave portions continuously connecting to each other with no interruption in a selected region are counted as "one concave portion". However, for example, even when two concave portions existing in a selected region bond to each other in a region adjacent to that region to form one concave portion, the two concave portions are counted as independent concave portions in the selected region.

Preferably, the pressure sensitive adhesive sheet of the present invention has, as shown by FIG. 1 (a) to FIG. 1 (d), plural concave portions 13 (preferably concave portions having irregular shapes) on the surface ($\alpha$) of the resin layer 12 that is on the opposite side to the side on which the substrate 11 or the release material 14 is provided.

Also preferably, in the pressure sensitive adhesive sheet of the present invention, the concave portions (preferably the concave portions having irregular shapes) existing on the surface ($\alpha$) are preferably those satisfying any one or more of the following requirements (I) to (IV), more preferably, the concave portions satisfying the requirement (I) satisfy any one or more of the requirements (II) to (IV), and even more preferably, the concave portions satisfying the requirement (I) further satisfy all of the requirements (II), (III) and (IV).

Requirement (I): The concave portion has a maximum height difference of 0.5 µm or more.

Requirement (II): Plural concave portions exist on the surface ($\alpha$) of the resin layer, and 95% or more of the plural concave portions each have a different shape.

Requirement (III): One or more concave portions mentioned above exist in a region (Q) surrounded by an arbitrarily selected square having an edge length of 1 mm on the surface ($\alpha$).

Requirement (IV): Plural concave portions exist on the surface ($\alpha$) of the resin layer, and the positions of the plural concave portions do not have periodicity.

The requirements (I) to (IV) are described in detail hereinunder.

<Requirement (I)>

Figure 2:
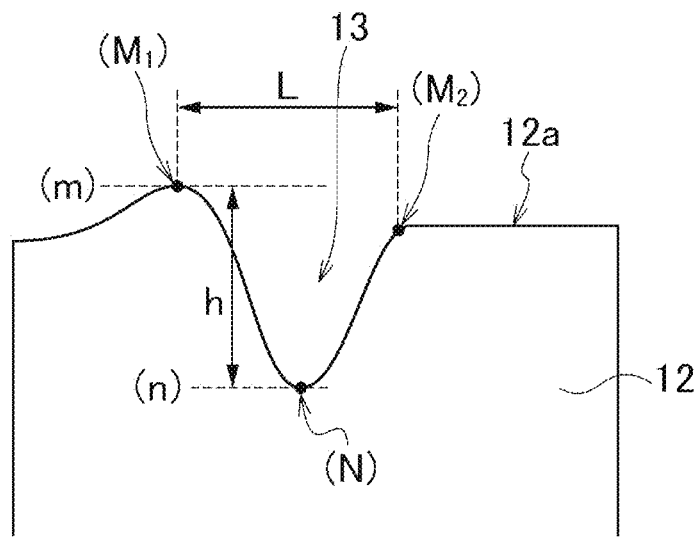
FIG. 2 is a schematic cross sectional view showing an example of the shape of the resin layer on the side of the surface (α) of the pressure sensitive adhesive sheet of the present invention.
Figure 2:
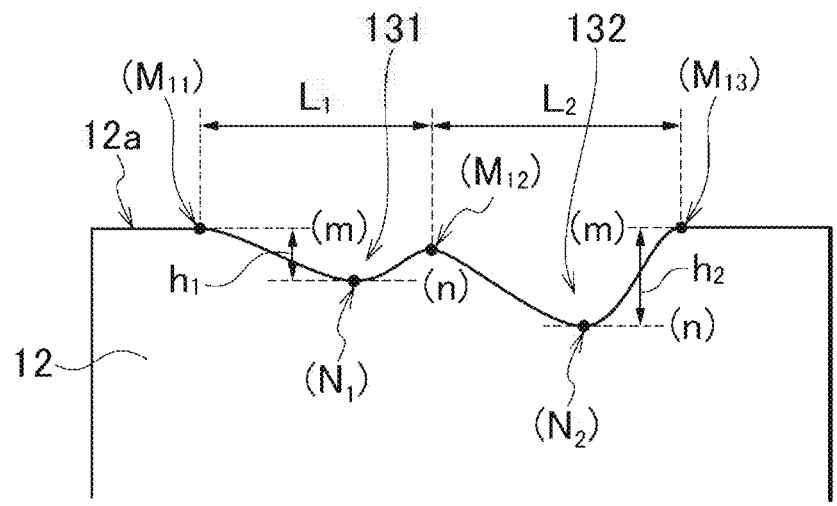

FIG. 2 includes schematic cross-sectional views of a resin layer, showing examples of a shape on the side of the surface ($\alpha$) of the resin layer that the pressure sensitive adhesive sheet of the present invention has.

Like the concave portions 13 shown in FIG. 2(a), the shape of an ordinary concave portion has two mountain parts ($M_1$) and ($M_2$) and a valley part (N). The "height difference" of the concave portion in the present invention means the length of the difference (h) between the highest position (m) of the two mountain parts ($M_1$) and ($M_2$) (in FIG. 2(a), the maximum point of the mountain part ($M_1$)) and the lowest position (n) thereof (in FIG. 2(a), the minimum point of the valley part (N)), relative to the thickness direction of the resin layer 12.

It is considered that the case of FIG. 2(b) would have two concave portions of a concave portion 131 having two mountain parts ($M_{11}$) and ($M_{12}$) and a valley part ($N_1$), and a concave portion 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the height difference of the concave portion 131, and the length of the difference ($h_2$) between the maximum point of the mountain part ($M_{13}$) and the minimum point of the valley part ($N_2$) indicates the height difference of the concave portion 132.

The "one or more concave portion" defined by the requirement (I) indicates a concave portion having a maximum height difference of 0.5 µm or more. The "concave portion" defined by the requirement (I) may be one having a site with a height difference of 0.5 µm or more in any part of the concave portion, and the concave portion needs not to have the height difference in the entire region thereof.

Preferably, plural concave portions satisfying the requirement (I) exist on the surface.

Regarding the presence or absence of plural concave portions satisfying the requirement (I), the region (P) surrounded by an arbitrarily selected square having an edge length of 5 mm on the surface (α) of the resin layer of the pressure sensitive adhesive sheet is observed with an electronic microscope for the judgment. More specifically, the presence or absence is judged according to the method described in the section of Examples.

The maximum value of the height difference of one concave portion existing inside the region (P) is, from the viewpoint of improving the air escape property of the pressure sensitive adhesive sheet, from the viewpoint of keeping the appearance of the pressure sensitive adhesive sheet good, and from the viewpoint of the shape stability of the pressure sensitive adhesive sheet, preferably 1.0 µm or more and not more than the thickness of the resin layer, more preferably 3.0 µm or more and not more than the thickness of the resin layer, and even more preferably 5.0 µm or more and not more than the thickness of the resin layer.

The ratio of the maximum height difference of plural concave portions existing inside the region (P) to the thickness of the resin layer [maximum height difference/thickness of resin layer] is preferably 1/100 to 100/100, more preferably 5/100 to 99/100, even more preferably 10/100 to 96/100, still more preferably 15/100 to 90/100.

The mean value of the width of the concave portions is, from the viewpoint of improving the air escape property of the pressure sensitive adhesive sheet and from the viewpoint of bettering the pressure sensitive adhesiveness of the pressure sensitive adhesive sheet, preferably 1 to 500 µm, more preferably 3 to 400 µm, even more preferably 5 to 300 µm.

In the present invention, the width of the concave portion means the distance between the maximum points of the two mountain parts, and in the concave portions 13 shown in FIG. 2(a), the width indicates the distance L between the mountain part ($M_1$) and the mountain part ($M_2$). In the concave portion 131 shown in FIG. 2(b), the width indicates the distance $L_1$ between the mountain part ($M_{11}$) and the mountain part ($M_{12}$), and in the concave portion 132 therein, the width indicates the distance L2 between the mountain part ($M_{13}$) and the mountain part ($M_{12}$).

In a planar view of the pressure sensitive adhesive sheet of the present invention (when the sheet is viewed from directly above), when the concave portion has a long wide and a short side, the short side is the width.

The ratio of the maximum height difference of one concave portion to the mean value of the width [maximum height difference/mean value of width) (in the concave portion 13 shown in FIG. 2(a), the ratio is "h/L") is, from the viewpoint of improving the air escape property of the pressure sensitive adhesive sheet and from the viewpoint of bettering the pressure sensitive adhesiveness of the pressure sensitive adhesive sheet, preferably 1/500 to 100/1, more preferably 3/400 to 70/3, even more preferably 1/60 to 10/1.

<Requirement (II)>

Like the above-mentioned requirement (II), in one embodiment of the pressure sensitive adhesive sheet of the present invention, it is desirable that plural concave portions exist on the surface (α) of the resin layer and 95% or more of the plural concave portions have shapes that differ from each other.

Presence of plural concave portions that satisfy the requirement (II) on the surface (α) of the resin layer makes it possible to enlarge the value of the standard deviation (σ) based on the mean brightness value of the surface (α), therefore providing a pressure sensitive adhesive sheet having well-balanced characteristics of air escape property and pressure sensitive adhesion characteristics.

In one embodiment of the pressure sensitive adhesive sheet of the present invention, the ratio of the plural concave portions having shapes differing from each other on the surface (α) of the resin layer is preferably 98% or more, and is more preferably 100%, relative to the total number (100%) of the concave portions existing on the surface (α).

In the present invention, the presence of absence of the concave portions satisfying the requirement (II) may be judged as follows. First, the region (P) surrounded by an arbitrarily selected square having an edge length of 5 mm on the surface (α) of the resin layer of the targeted pressure sensitive adhesive sheet is observed with an electron microscope, and the presence or absence of plural concave portions therein is confirmed.

Next, in the case where the presence of plural concave portions in the region (P) has been confirmed, the shapes of the plural concave portions are observed with an electronic microscope (magnification: 30 to 100), and when the number of the concave portions having shapes differing from each other is preferably 95% or more (more preferably 98% or more, even more preferably 100%) relative to the total number (100%) of the plural concave portions existing inside the region (P), it is judged that the observed sheet is a pressure sensitive adhesive sheet having a resin layer where concave portions satisfying the above requirement (II) exist on the surface (α) thereof. For the observation of the shapes of the plural concave portions, a method of directly observing the sheet with an electronic microscope having the above-mentioned magnification may be employed, or a method of taking a picture of the sheet using an electronic microscope having the above-mentioned magnification, and visually observing the shapes of the plural concave portions shown on the image may also be employed. More specifically, the satisfaction of the requirement may be judged according to the method described in the section of Examples.

Here, "the number of the one or more concave portions having shapes differing from each other is 100%" means that "all the plural concave portions observed inside the region (P) have shapes differing from each other".

<Requirement (III)>

Figure 3:
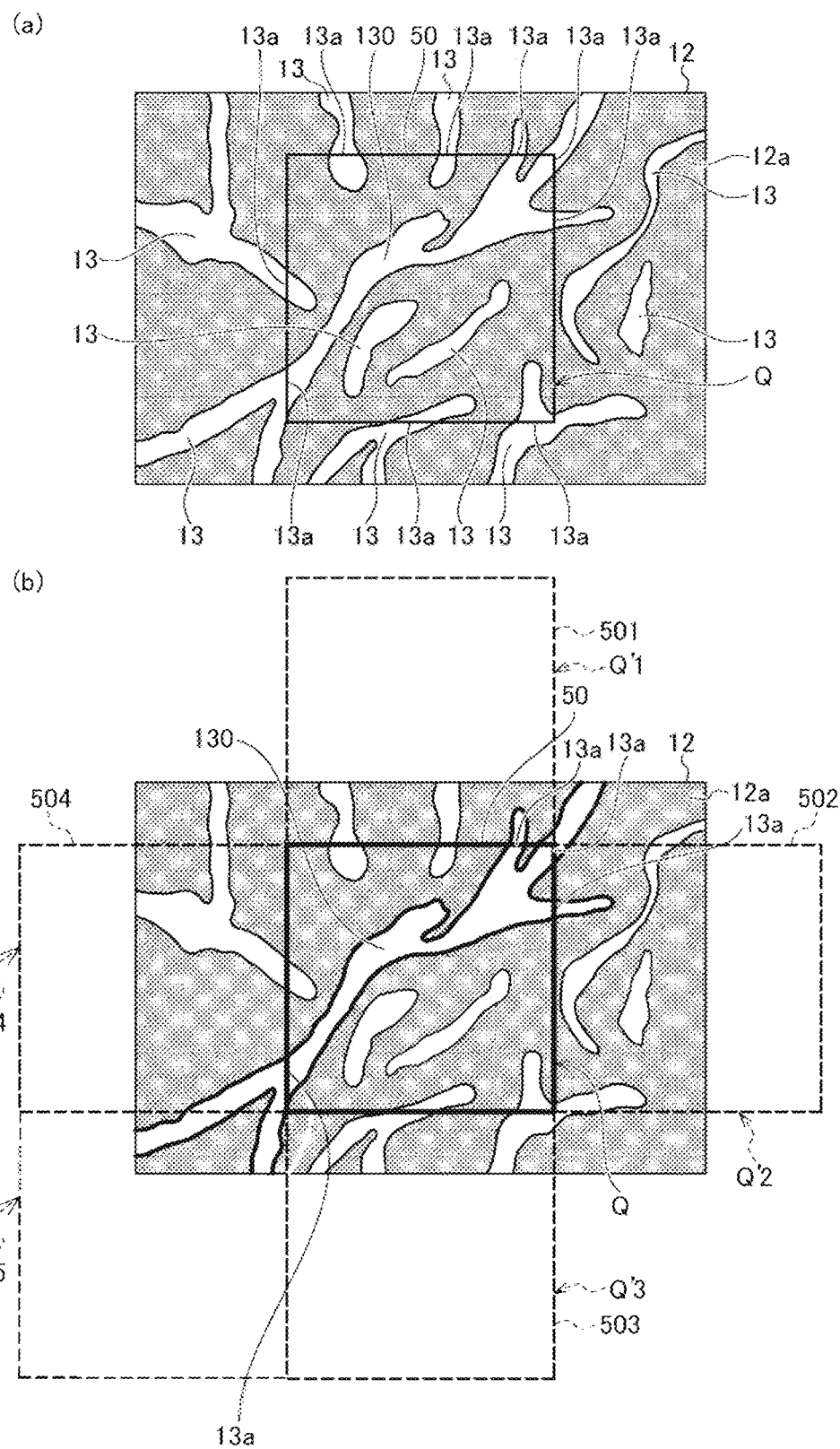
FIG. 3 is a schematic plan view showing an example of the surface (α) of the resin layer of the pressure sensitive adhesive sheet of the present invention.

FIG. 3 (a) and FIG. 3 (b) includes schematic plan views of the surface (α), showing one example of the surface (α) of the resin layer that one embodiment of the pressure sensitive adhesive sheet of the present invention has.

As shown by FIG. 3(a) and like the above-mentioned requirement it is desirable that one embodiment of the pressure sensitive adhesive sheet of the present invention has one or more concave portions 13 and 130 in the region (Q) surrounded by the arbitrarily selected square 50 having an edge length of 1 mm (hereinafter, the 1-mm square 50) on the surface (α) 12a of the resin layer 12. For example, in FIG. 3(a), 8 concave portions exist in the region (Q).

In that manner, the presence of one or more of the above-mentioned concave portions in the region (Q) on the surface (α) makes it possible to enlarge the value of the standard deviation (σ) based on the mean brightness value of the surface (α), therefore providing a pressure sensitive adhesive sheet having well-balanced characteristics of air escape property and pressure sensitive adhesion characteristics.

In the present invention, the number of the concave portions existing in the region (Q) on the surface (α) is preferably one or more, but from the above-mentioned viewpoint, the number is more preferably 2 or more, and even more preferably 3 or more. On the other hand, from the viewpoint of keeping the good appearance and the pressure sensitive adhesion characteristics of the pressure sensitive adhesive sheet, the number is preferably 1000 or less, more preferably 500 or less.

From the viewpoint of improving the air escape property of the pressure sensitive adhesive sheet, it is desirable that one or more concave portions 13 and 130 existing in the region (Q) on the surface (α) 12a of the resin layer 12 that one embodiment of the pressure sensitive adhesive sheet of the present invention has extend toward any side of the 1-mm square 50 that is a boundary line of the region (Q), as shown by FIG. 3(a).

On the surface (α) 12a of the resin layer 12 of the pressure sensitive adhesive sheet shown by FIG. 3(a), the number of the cross lines 13a, at which the concave portions 13 or 130 extends to cross any side of the 1-mm square 50 that is a boundary line of the region (Q), is 9 in total.

The number of the cross lines at which the concave portion extends to cross any side of the 1-mm square that is a boundary line of the region (Q) is preferably one or more, more preferably 2 or more, even more preferably 3 or more.

From the viewpoint of providing a pressure sensitive adhesive sheet having more improved air escape property, one or more concave portions existing in the region (Q) on the surface (α) of the resin layer that one embodiment of the pressure sensitive adhesive sheet of the present invention has preferably have a shape that continuously extends into the other one or more regions (Q') surrounded by a square having an edge length of 1 mm, which is adjacent to the region (Q), more preferably have a shape that continuously extends into the other two or more regions (Q), and even more preferably have a shape that continuously extends into the other three or more regions (Q'), For example, in FIG. 3(b), the region (Q) surrounded by a 1-mm square 50 arbitrarily selected on the surface (α) 12a of the resin layer 12 is specifically noted. The "other region (Q') surrounded by a square having an edge length of 1 mm, which is adjacent to the region (Q)" indicates the region (Q'1) surrounded by the square 501 having an edge length of 1 mm (hereinafter, 1-mm square 501), the region (Q'2) surrounded by the square 502 having an edge length of 1 mm (hereinafter, 1-mm square 502), the region (Q'3) surrounded by the square 503 having an edge length of 1 mm (hereinafter, 1-mm square 503), and the region (Q'4) surrounded by the square 504 having an edge length of 1 mm (hereinafter, 1-mm square 504).

Further, the "concave portion 130" existing on the surface (α) 12a of the resin layer 12 shown in FIG. 3(b) is specifically noted. The "concave portion 130" is a region existing in the region (Q) surrounded by the 1-mm square 50, and has a shape extending into the region (Q'1) surrounded by the 1-mm square 501 adjacent to the region (Q), into the region (Q'2) surrounded by the 1-mm square 502, and into the region (Q'4) surrounded by the 1-mm square 504.

Presence of the concave portion having a shape extending not only into the region (Q) but also into the other region (Q') adjacent to the region (Q) on the surface (α), like the "concave portion 130" shown in FIG. 3(b), provides a pressure sensitive adhesive sheet having more improved air escape property.

In addition, it is desirable that the concave portions existing in the region (Q) on the surface (α) of the resin layer have a shape extending not only into one or more region (Q') adjacent to the region (Q) but also further continuously into any other regions (Q") than the region (Q), which are adjacent to the other region (Q').

For example, the "concave portion 130" shown in FIG. 3(b) has a shape extending not only into the region (Q'4) adjacent to the region (Q) but also further continuously into the region (Q'5) adjacent to the region (Q'4).

<Requirement (IV)>

In one embodiment of the pressure sensitive adhesive sheet of the present invention, preferably, plural concave portions exist on the surface (α) 12a of the resin layer 12 and the positions of the plural concave portions do not have periodicity, as shown in FIG. 3(a) and like the above-mentioned requirement (IV)

In the present invention, the wording "the positions of the plural concave portions do not have periodicity" means a state where the plural concave portions exist irregularly (randomly) not having the same repeating pattern. Namely, the state differs from a state of "arrangement" based on specific regularity, like that for the grooves described in PTL 1, that is, like that for grooves formed through embossed pattern transfer of pressing a release material having an embossed pattern to the surface of a resin layer.

Since the positions of the plural concave portions do not have periodicity, the standard deviation (σ) based on the mean brightness value of the surface (α) can be controlled to fall within the above range, therefore providing a pressure sensitive adhesive sheet having well-balanced characteristics of air escape property and pressure sensitive adhesion characteristics.

For judgement whether or not "the positions of plural concave portions do not have periodicity", in principle, the positions of the plural concave portions existing on the surface (α) of the resin layer of the targeted pressure sensitive adhesive sheet are identified through visual observation thereof or through observation thereof with a digital microscope (magnification: 30 to 100).

However, for the judgement, ten regions (R) each surrounded by an arbitrarily selected square having an edge length of 4 mm on the surface (α) are selected, and the "positions of the plural concave portions" existing inside the region (R) may be identified visually or with a digital microscope (magnification: 30 to 100). Namely, when the "positions of plural concave portions" existing in all the selected ten regions do not have any periodicity, the analyzed pressure sensitive adhesive sheet can be considered to satisfy the requirement (IV).

For the observation, a method of direct observation thereof with an electron microscope at the magnification as mentioned above may be employed, or a method of taking an image thereof with a digital microscope having the above-mentioned magnification, followed by visually observing the positions of the plural concave portions shown in the image may also be employed.

<Requirement (V)>

From the viewpoint of controlling the standard deviation ($\sigma$) based on the mean brightness value of the surface ($\alpha$) to fall within the above range to provide a pressure sensitive adhesive sheet having well-balanced characteristics of air escape property and pressure sensitive adhesion characteristics, one embodiment of the pressure sensitive adhesive sheet of the present invention preferably satisfies the following requirement (V).

Requirement (V): The shapes of one or more attached faces on the surface ($\alpha$) of the resin layer has an irregular shape.

In the present invention, "one or more attached faces on the surface ($\alpha$)" means a surface from which the range occupied by the plural concave portions on the surface ($\alpha$) of the resin layer is excluded, and means a face that is to be attached to an adherend when an adherend is attached to the pressure sensitive adhesive sheet.

In the schematic plan view of FIG. 3($a$), the "one or more attached faces" indicates the shaded part except the plural concave portions 13 of the surface ($\alpha$) 12$a$ of the resin layer.

The wording "the shapes of the one or more attached faces have irregular shapes" means that the shapes of the one or more attached faces do not have any specific shape such as a shape surrounded by a circle or a line alone (triangle, square, etc.) like the shape of the shaded part of the surface ($\alpha$) 12$a$ of the resin layer shown in FIG. 3($a$), and the shape therefore does not have a predetermined repeating pattern. Namely, shapes of one or more attached faces to be formed through embossed pattern transfer of pressing an embossed pattern-having release material against the surface of a resin layer or the like is excluded.

In other words, in the pressure sensitive adhesive sheet satisfying the requirement (II) and the requirement (IV), it is considered that the shapes of the one or more attached faces on the surface ($\alpha$) would have an irregular shape.

For judgement whether or not "the shapes of the one or more attached faces on the surface ($\alpha$) have irregular shapes", in principle, the shapes of the one or more attached faces on the surface ($\alpha$) of the resin layer of the targeted pressure sensitive adhesive sheet are observed visually or with a digital microscope (magnification: 30 to 100).

However, for the judgement, ten regions (R) each surrounded by a square arbitrarily selected square having an edge length of 4 mm on the surface ($\alpha$) are selected, and the "shapes of the one or more attached faces" in the region (R) may be observed visually or with a digital microscope (magnification: 30 to 100). Namely, when the "shapes of the one or more attached faces" in each region is judged to have irregular shapes, it may be considered that the analyzed pressure sensitive adhesive sheet could satisfy the requirement (V).

For the above observation, a method of direct observation thereof with an electron microscope at the magnification as mentioned above may be employed, or a method of taking an image thereof with a digital microscope having the above-mentioned magnification, followed by visually observing the shapes of the one or more attached faces on the image may also be employed.

In the following, each constitution of the pressure sensitive adhesive sheet of the present invention will be described.

Substrate

The substrate used in one embodiment of the present invention is not particularly limited, and examples thereof include a paper substrate, a resin film or sheet, and a substrate containing a paper substrate laminated with a resin, which may be appropriately selected depending on the purpose of the pressure sensitive adhesive sheet according to one embodiment of the present invention.

Examples of paper constituting the paper substrate include thin paper, medium quality paper, wood-free paper, impregnated paper, coated paper, art paper, parchment paper, and glassine paper.

Examples of the resin constituting the resin film or sheet include a polyolefin resin, such as polyethylene and polypropylene; a vinyl resin, such as polyvinyl chloride, polyvinylidene chloride, polyvinyl alcohol, an ethylene-vinyl acetate copolymer, and an ethylene-vinyl alcohol copolymer; a polyester resin, such as polyethylene terephthalate, polybutylene terephthalate, and polyethylene naphthalate; polystyrene; an acrylonitrile-butadiene-styrene copolymer; cellulose triacetate; polycarbonate; a urethane resin, such as polyurethane and acrylic-modified polyurethane; polymethylpentene; polysulfone; polyether ether ketone; polyether sulfone; polyphenylenesulfide; a polyimide resin, such as polyether imide and polyimdie; a polyamide resin; an acrylic resin; and a fluorine resin.

Examples of the substrate containing a paper substrate laminated with a resin include laminated paper containing the aforementioned paper substrate laminated with a then neoplastic resin, such as polyethylene.

Among these substrates, a resin film or sheet is preferred, a film or sheet formed of a polyester resin is more preferred, and a film or sheet for need of polyethylene terephthalate (PET) is further preferred.

In the case where the pressure sensitive adhesive sheet of the present invention is applied to a purpose that requires heat resistance, a film or sheet constituted by a resin selected from polyethylene naphthalate and a polyimide resin is preferred, and in the case where the pressure sensitive adhesive sheet is applied to a purpose that requires weather resistance, a film or sheet constituted by a resin selected from polyvinyl chloride, polyvinylidene chloride, an acrylic resin, and a fluorine resin is preferred.

The thickness of the substrate may be appropriately determined depending on the purpose of the pressure sensitive adhesive sheet of the present invention, and is preferably from 5 to 1,000 μm, more preferably from 10 to 500 μm, further preferably from 12 to 250 μm, and still further preferably from 15 to 150 μm, from the standpoint of the handleability and the economic efficiency.

The substrate may further contain various additives, such as an ultraviolet ray absorbent, a light stabilizer, an antioxidant, an antistatic agent, a slipping agent, an antiblocking agent, and a colorant.

The substrate used in one embodiment of the present invention is preferably a non-air permeable substrate from the standpoint of enhancing the blister resistance of the resulting pressure sensitive adhesive sheet, and specifically a substrate containing the aforementioned resin film or sheet having a metal layer on the surface thereof.

Examples of the metal forming the metal layer include a metal having metallic gloss, such as aluminum, tin, chromium, and titanium.

Examples of the method of forming the metal layer include a method of vapor-depositing the metal by a PVD method, such as vacuum vapor deposition, sputtering, and ion plating, and a method of attaching a metal foil formed of the metal with an ordinary pressure sensitive adhesive, and a method of vapor-depositing the metal by a PVD method is preferred.

In the case where a resin film or sheet is used as the substrate, the surface of the resin film or sheet may be subjected to a surface treatment by an oxidizing method, a roughening method, and the like, or may be subjected to a primer treatment, from the standpoint of enhancing the adhesion to the resin layer to be laminated on the resin film or sheet.

Examples of the oxidizing method include a corona discharge treatment, a plasma discharge treatment, a chromic acid treatment (wet process), a hot air treatment, and an ozone treatment, and an ultraviolet ray irradiation treatment, and examples of the roughening treatment include a sand blasting treatment and a solvent treatment.

Release Material

The release material used in one embodiment of the present invention may be a release sheet having both surfaces subjected to a release treatment, and a release sheet having one surface subjected to a release treatment, and examples thereof include a substrate for the release material having coated thereon a release agent. The release treatment s preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet according to one embodiment of the present invention.

Examples of the release agent include a rubber elastomer, such as a silicone resin, an olefin resin, an isoprene resin, and a butadiene resin, a long-chain alkyl resin, an alkyd resin, and a fluorine resin.

The thickness of the release material is not particularly limited, and is preferably from 10 to 200 μm, more preferably from 25 to 170 μm, and further preferably from 35 to 80 μm.

[Resin Layer]

The resin layer that the pressure sensitive adhesive sheet of the present invention has contains a resin part (X) containing a resin as a main component and a particle part (Y) consisting of fine particles.

In the pressure sensitive adhesive sheet of the present invention, at least the surface (α) of the resin layer on the side opposite to the side on which at least substrate or a release material is provided has pressure sensitive adhesiveness, but the surface (β) of the resin layer on the side on which a substrate or a release material is provided may also has pressure sensitive adhesiveness.

As the resin layer, there may be mentioned a configuration of a layer having a multilayer structure formed by laminating a layer (Xβ) mainly containing a resin part (X), a layer (Y1) containing a particle part (Y) in an amount of 15% by mass or more, and a layer (Xα) mainly containing a resin part (X) in this order from the side of a substrate or a release material, like in the pressure sensitive adhesive sheet 1a in FIG. 1.

The configuration of the multilayer structure mentioned above may also be a mixed layer configuration where the boundary between the layer (Xβ) and the layer (Y1), and/or the boundary between the layer (Y1) and the layer (Xα) could not be discerned.

The layer (Xβ) and the layer (Xα) are layers mainly containing the resin part (X) but may also contain a particle part (Y). However, the content of the particle part (Y) in the layer (Xβ) and the layer (Xα) is each independently less than 15% by mass relative to the total mass (100% by mass) of the layer (Xβ) or the layer (Xα) and is smaller than the content of the resin constituting the resin part (X).

The layer (Xβ) and the layer (Xα) may have a void part (Z) to be mentioned hereinunder, in addition to the resin part (X) and the particle part (Y).

The content of the resin in the layer (Xβ) and the layer (Xα) is each independently generally 50 to 100% by mass, and is preferably 65 to 100% by mass, more preferably 75 to 100% by mass, even more preferably 85 to 100% by mass, still more preferably 90 to 100% by mass, relative to the total mass (100% by mass) of the layer (Xβ) or the layer (Xα).

In the present invention, the "content of the resin in the layer (Xβ) and the layer (Xα)" may be considered to be the content of the resin in the total amount (100% by mass (but excluding diluent solvent)) of the resin composition that is the forming material for the layer (Xβ) or the layer (Xα).

The content of the fine particles constituting the particle part (Y) in the layer (Xβ) and the layer (Xα) is each independently less than 15% by mass relative to the total mass (100% by mass) of the layer (Xβ) or the layer (Xα), but is preferably 0 to 13% by mass, more preferably 0 to 10% by mass, even more preferably 0 to 5% by mass, still more preferably 0% by mass, relative to the total mass (100% by mass) of the layer (Xβ) or the layer (Xα).

In the present invention, the "content of the fine particles in the layer (Xβ) and the layer (Xα)" may be considered to be the content of the fine particles in the total amount (100% by mass (but excluding diluent solvent)) of the resin composition that is the forming material for the layer (Xβ) or the layer (Xα).

Preferably, the layer (Xβ) and the layer (Xα) each are a layer formed of a composition (xβ) or (xα) containing a resin as a main component to be mentioned hereinunder.

The layer (Y1) containing the particle part in an amount of 15% by mass or more may be a layer formed of the particle part (Y) alone or may also be a layer containing the resin part (X) along with the particle part (Y), and may further has a void part (Z) to be mentioned hereinunder.

The content of the fine particles constituting the particle part (Y) in the layer (Y1) is 15% by mass or more relative to the total mass (100% by mass) of the layer (Y1), but is preferably 20 to 100% by mass, more preferably 25 to 90% by mass, even more preferably 30 to 85% by mass, still more preferably 35 to 80% by mass, relative to the total mass (100% by mass) of the layer (Y1).

In the present invention, the "content of the fine particles in the layer (Y1)" may also be considered to be the content of the fine particles in the total amount (100% by mass (but excluding diluent solvent)) of the composition that is the forming material for the layer (Y1).

The content of the resin in the layer (Y1) is generally 1 to 85% by mass, and is preferably 5 to 80% by mass, more preferably 10 to 75% by mass, even more preferably 20 to 70% by mass, still more preferably 25 to 65% by mass, relative to the total mass (100% by mass) of the layer (Y1).

In the present invention, the "content of the resin in the layer (Y1)" may also be considered to be the content of the resin in the total amount (100% by mass (but excluding diluent solvent)) of the composition that is the forming material for the layer (Y1).

Preferably, the layer (Y1) is formed of a composition (y) containing tine particles in an amount of 15% by mass or more to be mentioned hereinunder.

Preferably, the resin layer that one embodiment of the pressure sensitive adhesive sheet of the present invention additionally has a void part (Z) in addition to the resin part (X) and the particle part (Y). The void part (Z), if any, in the resin layer can improve the blister resistance of the pressure sensitive adhesive sheet.

The void part (Z) includes the voids existing between the fine particles and, when the fine particles are secondary particles, the voids existing inside the secondary particles, In the case where the resin layer has a multilayer structure, even though a void part (Z) exists in the process of forming the resin layer or just after formation of the layer, the resin part (X) may flow into the void part (Z) and therefore the voids may disappear to give a resin layer not having the void part (Z), However, even in the case where a void part (Z) having existed in the resin layer for a period of time has disappeared, the resin layer that one embodiment of the pressure sensitive adhesive sheet of the present invention has may have one or more concave portions on the surface ($\alpha$) and can be therefore excellent n air escape property and blister resistance, The shear storage elastic modulus at 100°C. of the resin layer that one embodiment of the pressure sensitive adhesive sheet of the present invention has is, from the viewpoint of improving the air escape property and the blister resistance of the pressure sensitive adhesive sheet, preferably $9.0 \times 10^3$ Pa or more, more preferably $1.0 \times 10^4$ Pa, even more preferably $2.0 \times 10^4$ Pa or more.

In the present invention, the shear storage elastic modulus at 100° C. of the resin layer means a value measured with a viscoelastometer (for example, apparatus name "DYNAMIC ANALYZER RDA II" manufactured by Rheometrics Inc.) at a frequency of 1 Hz.

The thickness of the resin layer is preferably 1 to 300 µm, more preferably 5 to 150 µm, even more preferably 10 to 75 µm.

The adhesive strength of the surface ($\alpha$) of the resin layer of one embodiment of the pressure sensitive adhesive sheet of the present invention is preferably 0.5 N/25 mm or more, more preferably 2.0 N/25 mm or more, even more preferably 3.0 N/25 mm or more, further more preferably 4.0 N/25 mm or more, still further more preferably 7.0 N/25 mm or more.

In the case where the surface ($\beta$) of the resin layer also has pressure sensitive adhesiveness, the adhesive strength of the surface ($\beta$) preferably belongs to the above-mentioned range.

The value of the adhesive strength of the pressure sensitive adhesive sheet means a value measured according to the method described in the section of Examples.

<Resin Part (X)>

The resin part (X) constituting the resin layer contains a resin as a main component.

In the present invention, the resin part (X) is a part containing any other component than fine particles contained in the resin layer, and in this point, this is differentiated from the particle part (Y).

The resin part (X) contains a resin as a main component and may contain a crosslinking agent and ordinary additives in addition to resin.

The content of the resin in the resin part (X) is generally 40% by mass or more, and is preferably 50% by mass or more, more preferably 65% by mass or more, even more preferably 75% by mass or more, still more preferably 85% by mass or more, further more preferably 90% by mass or more, relative to the total amount (100% by mass) of the resin part (X), and is preferably 100% by mass or less, more preferably 99.9% by mass or less, relative to the total amount (100% by mass) of the resin part (X).

In the present invention, a value of the content of the resin in the resin composition to be the forming material for the resin part (X) may be considered to be the above-mentioned "content of the resin in the resin part (X)".

The resin to be contained in the resin part (X) is preferably a pressure sensitive adhesive resin from the viewpoint of making the surface ($\alpha$) of the resin layer to be formed express pressure sensitive adhesiveness.

In particular, in the case where the resin layer has a multilayer structure formed by laminating a layer (X$\beta$), a layer (Y1) and a layer (X$\alpha$) in this order from the side on which a substrate or a release material is provided, like in the pressure sensitive adhesive sheet 1a of FIG. 1(a), it is desirable from the above-mentioned viewpoints that at least the layer (X$\alpha$) contains a pressure sensitive adhesive resin.

Examples of the pressure sensitive adhesive resin include acrylic resins, urethane resins, rubber resins, silicone resins, etc.

Among these adhesive resins, an acrylic resin is preferably contained from the viewpoint that the pressure sensitive adhesion characteristics and the weather resistance thereof are good and that one or more concave portions enabling the standard deviation ($\sigma$) based on the mean brightness value of the surface ($\alpha$) of the resin layer to fall within the above-described range are easy to form.

The content of the acrylic resin is preferably 25 to 100% by mass, and is more preferably 50 to 100% by mass, even more preferably 70 to 100% by mass, still more preferably 80 to 100% by mass, further more preferably 100% by mass, relative to the total amount (100% by mass) of the resin contained in the resin part (X).

From the viewpoint hat one or more concave portions enabling the standard deviation ($\sigma$) based on the mean brightness value of the surface ($\alpha$) of the resin layer to fall within the above-described range are easy to form, it is desirable that the resin part (X) contains a resin having a functional group, more preferably an acrylic resin having a functional group.

In particular, in the case where the resin layer has a multilayer structure formed by laminating a layer (X$\beta$), a layer (Y1) and a layer (X$\alpha$) in this order from the side on which a substrate or a release material is provided, like in the pressure sensitive adhesive sheet 1a of FIG. 1(a), it is desirable from the above-mentioned viewpoints that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, an alkoxysilyl group, etc., but a carboxyl group is preferred.

Also preferably, the resin part (X) further contains a crosslinking agent along with the resin having a functional group. In particular, in the case where the resin layer has the above-mentioned multilayer structure, it is desirable that at least the layer (Y1) contains a crosslinking agent along with the above-mentioned, functional group-having resin.

Examples of the crosslinking agent include an isocyanate crosslinking agent, an epoxy crosslinking agent, an aziridine crosslinking agent, a metal chelate crosslinking agent, etc.

Examples of the isocyanate crosslinking agent include aromatic polyisocyanates such as tolylene diisocyanate, diphenylmethane diisocyanate, xylylene diisocyanate, etc.; aliphatic polyisocyanates such as hexamethylene diisocyanate, etc.; alicyclic polyisocyanates such as isophorone diisocyanate, hydrogenated diphenylmethane diisocyanate, etc.; biuret forms and isocyanurate forms of these compounds, and adduct forms that are reaction products with a low-molecular active hydrogen-containing compounds (ethylene glycol, propylene glycol, neopentyl glycol, trimethylolpropane, castor oil, etc.); etc.

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, diglycidylamine, etc.

Examples of the aziridine crosslinking agent include diphenylmethane-4,4'-bis(1-aziridinecarboxamide), trimethylolpropane-tri-β-aziridinylpropionate, tetramethylolmethane tri-β-aziridinylpropionate, toluene-2,4-bis(1-aziridinecarboxamide), triethylenemelamine, bisisophthaloyl-1-(2-methylaziridine), tris-1-(2-methylaziridine)phosphine, trimethylolpropane tri-β-(2-methylaziridine)propionate, etc.

The metal chelate crosslinking agent includes chelate compounds where the metal atom is aluminium, zirconium, titanium, zinc, iron, tin or the like. From the viewpoint that plural concave portions satisfying the above requirements (I) to (III) are easy to form, an aluminium chelate crosslinking agent is preferred.

Examples of the aluminium chelate crosslinking agent include diisopropoxyaluminium monooleyl acetacetate, monoisopropoxyaluminium bisoleyl acetacetate, monoisopropoxyalumiium monooleate monoethylacetacetate, diisopropoxyaluminium monolauroyl acetacetate, diisopropoxyaluminium monostearyl acetacetate, diisopropoxyaluminium monoisostearyl acetacetate, etc.

One alone or two or more of these crosslinking agents may be used either singly or as combined.

Among these, from the viewpoint that one or more concave portions enabling the standard deviation (σ) based on the mean brightness value of the surface (α) of the resin layer to fall within the above-described range, it is desirable that the resin part (X) contains one or more selected from a metal chelate crosslinking agent and an epoxy crosslinking agent, more preferably contains a metal chelate crosslinking agent, and even more preferably contains an aluminium chelate crosslinking agent.

The content of the crosslinking agent is preferably 0.01 to 15 parts by mass, and is more preferably 0.1 to 10 parts by mass, even more preferably 0.3 to 7.0 parts by mass, relative to 100 parts by mass of the resin having a functional group.

From the viewpoint of bettering the shape retentive force of the plural concave portions on the surface (α) of the resin layer, it is desirable that the resin part (X) contains both a metal chelate crosslinking agent and an epoxy crosslinking agent.

In the case where the resin part (X) contains both a metal chelate crosslinking agent and an epoxy crosslinking agent, the content ratio by mass of the metal chelate crosslinking agent to the epoxy crosslinking agent [metal chelate crosslinking agent/epoxy crosslinking agent] in the resin part (X) is, from the above-mentioned viewpoints, preferably 10/90 to 99.5/0.5, more preferably 50/50 to 99.0/1.0, even more preferably 65/35 to 98.5/1.5, further more preferably 75/25 to 98.0/2.0.

The resin part (X) may contain any ordinary additive.

Examples of the ordinary additive include a tackifier, an antioxidant, a softener (plasticizer), a rust inhibitor, a pigment, a dye, a retardant, a reaction accelerator, a UV absorbent, etc.

One alone or two or more of these ordinary additives may be used either singly or as combined.

In the case where these ordinary additives are contained, the content of each ordinary additive is preferably 0.0001 to 60 parts by mass, and is more preferably 0.001 to 50 parts by mass, relative to 100 parts by mass of the resin.

One alone or two or more resins may be contained in the resin part (X) either singly or as combined.

The forming material for the resin part (X) of the resin layer that the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter this may be simply referred to as "acrylic resin (A)"), and even more preferably an acrylic pressure sensitive adhesive containing a functional group-having acrylic resin (A) and a crosslinking agent (B).

The acrylic pressure sensitive adhesive may be any of a solvent-type one or an emulsion-type one.

The acrylic pressure sensitive adhesive favorable for the forming material for the resin part (X) is described below.

Examples of the acrylic resin (A) contained in the acrylic pressure sensitive adhesive include a polymer having a structural unit derived from an alkyl (meth)acrylate having a linear or branched alkyl group, a polymer having a structural unit derived from (meth)acrylate having a cyclic structure, etc.

The mass-average molecular weight (Mw) of the acrylic resin (A) is preferably 50,000 to 1,500,000, more preferably 150,000 to 1,300,000, even more preferably 250,000 to 1,100,000, still more preferably 350,000 to 900,000.

Preferably, the acrylic resin (A) contains an acrylic copolymer (A1) having a structural unit (a1) derived from an alkyl (meth)acrylate (a1') having an alkyl group with 1 to 18 carbon atoms (hereinafter this may be referred to as "monomer (a1')"), and a structural unit (a2) derived from a functional group-containing monomer (a2') (hereinafter this may be referred to as "monomer (a2')"), and more preferably contains an acrylic copolymer (A1).

The content of the acrylic copolymer (A1) is preferably 50 to 100% by mass, and is more preferably 70 to 100% by mass, even more preferably 80 to 100% by mass, further more preferably 90 to 100% by mass, relative to the total amount (100% by mass) of the acrylic resin (A) in the acrylic pressure sensitive adhesive.

The copolymerization morphology of the acrylic copolymer (A1) is not specifically limited, and the copolymer may be any of a block copolymer, a random copolymer or a graft copolymer.

The carbon number of the alkyl group that the monomer (a1') has is, from the viewpoint of improving pressure sensitive adhesion characteristics, more preferably 4 to 12, even more preferably 4 to 8, further more preferably 4 to 6.

Examples of the monomer (a1') include methyl (meth) acrylate, ethyl (meth)acrylate, propyl (meth)acrylate, butyl. (meth)acrylate, 2-ethylhexyl (meth)acrylate, lauryl (meth) acrylate, tridecyl (meth)acrylate, stearyl (meth)acrylate, etc.

Among these, butyl (meth)acrylate and 2-ethylhexyl (meth)acrylate are preferred, and butyl (meth)acrylate is more preferred.

The content of the structural unit (a1) is preferably 50 to 99.5% by mass, and is more preferably 60 to 99% by mass, even more preferably 70 to 95% by mass, still more preferably 80 to 93% by mass, relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, an alkoxysilyl group-containing monomer, etc.

Among these, a carboxy group-containing monomer is more preferred.

The carboxy group-containing monomer includes (meth)acrylic acid, maleic acid, fumaric acid, itaconic acid, etc., and (meth)acrylic acid is preferred.

The content of the structural unit (a2) is preferably 0.5 to 50% by mass, and is more preferably 1 to 40% by mass, even more preferably 5 to 30% by mass, still more preferably 7 to 20% by mass, relative to all the structural units (100% by mass) of the acrylic copolymer (A1).

The acrylic copolymer (A1) may have a structural unit (a3) derived from any other monomer (a3') than the above-mentioned monomers (a 1') and (a2').

Examples of the other monomer (a3') include (meth)acrylates having a cyclic structure such as cyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, imido (meth)acrylate, etc., vinyl acetate, acrylonitrile, styrene, etc.

The content of the structural unit (a3) is preferably 0 to 30% by mass, and is more preferably 0 to 20% by mass, even more preferably 0 to 10% by mass, still more preferably 0 to 5% by mass, relative to all the structural units (100% by mass) of the acrylic copolymer (A1).

One alone or two or more of the above-mentioned monomers (a1') to (a3') may be used either singly or as combined.

A method for synthesis of the acrylic copolymer (A1) component is not specifically limited. For example, the copolymer may be produced according to a method including dissolving starting monomers in a solvent and polymerizing them in a mode of solution polymerization in the presence of a polymerization initiator, a chain transfer agent and the like, or a method of emulsion polymerization in an aqueous system using starting monomers in the presence of an emulsifier, a polymerization initiator, a chain transfer agent, a dispersant, etc.

The crosslinking agent (B) to be contained in the acrylic pressure sensitive adhesive includes those mentioned hereinabove, but from the viewpoint of bettering pressure sensitive adhesion characteristics and from the viewpoint of facilitating the formation of concave portions enabling the standard deviation (σ) based on the mean brightness value of the surface (α) to fall within the above-described range, at least one or more selected from a metal chelate crosslinking agent and an epoxy crosslinking agent are preferably contained, more preferably a metal chelate crosslinking agent is contained, and even more preferably an aluminium chelate crosslinking agent is contained.

From the viewpoint of bettering the shape retentivity of plural concave portions on the surface (α) of the resin layer, the crosslinking agent (B) preferably contains both a metal chelate crosslinking agent and an epoxy crosslinking agent.

The content of the crosslinking agent (B) is preferably 0.01 to 15 parts by mass, and is more preferably 0.1 to 10 parts by mass, even more preferably 0.3 to 7.0 parts by mass, relative to 100 parts by mass of the acrylic resin (A) in the acrylic pressure sensitive adhesive.

In the case where a metal chelate crosslinking agent and an epoxy crosslinking agents are used as combined, the content ratio by mass of the metal chelate crosslinking agent to the epoxy crosslinking agent [metal chelate crosslinking agent/epoxy crosslinking agent] is preferably 10/90 to 99.5/0.5, more preferably 50/50 to 99.0/1.0, even more preferably 65/35 to 98.5/1.5, further more preferably 75/25 to 98.0/2.0.

The acrylic pressure sensitive adhesive to be used in one embodiment of the present invention may contain any ordinary additive within a range not detracting from the advantageous effects of the present invention. The general additive includes those mentioned hereinabove, and the content of the ordinary additive is also as mentioned above.

The acrylic pressure sensitive adhesive to be used in one embodiment of the present invention may contain any other pressure sensitive adhesive resin than the acrylic resin (A) (for example, urethane resin, rubber resin, silicone resin, etc.) within a range not detracting from the advantageous effects of the present invention.

The content of the acrylic resin (A) in the acrylic pressure sensitive adhesive is preferably 50 to 100% by mass, and is more preferably 70 to 100% by mass, even more preferably 80 to 100% by mass, still more preferably 100% by mass, relative to the total amount (100% by mass) of the pressure sensitive adhesive resin contained in the acrylic pressure sensitive adhesive.

<Particle Part (Y)>

The particle part (Y) constituting the resin layer is formed of fine particles.

The mean particle size of the fine particles is, from the viewpoint of improving the air escape property and the blister resistance of the pressure sensitive adhesive sheet and from the viewpoint of facilitating the formation of one or more concave portions enabling the standard deviation (σ) based on the mean brightness value of the surface (α) to fall within the above-described range, preferably 0.01 to 100 μm, more preferably 0.05 to 25 μm, even more preferably 0.1 to 10 μm.

The fine particles to be used in one embodiment of the present invention are not specifically limited, including inorganic particles such as silica particles, metal oxide particles, barium sulfate, calcium carbonate, magnesium carbonate, glass beads, smectite and the like, and organic particles such as acrylic beads, etc.

Among these fine particles, one or more kinds selected from silica particles, metal oxide particles and smectite are preferred, and silica particles are more preferred.

The silica particles that are used in one embodiment of the present invention may be any ones of dry-method silica and wet-method silica.

The silica particles that are used in one embodiment of the present invention may also be an organic-modified silica that has been surface-modified with an organic compound having a reactive functional group or the like, an inorganic-modified silica that has been surface-treated with an inorganic compound such as sodium aluminate, sodium hydroxide or the like, as well as an organic; inorganic-modified silica that has been surface-treated with any of these organic compounds and inorganic compounds, or an organic/inorganic-modified silica that has been surface-treated with an organic/inorganic hybrid material of a silane coupling agent, etc.

These silica particles may be in the form of a mixture of two or more kinds.

The mass concentration of silica in the silica particles is preferably 70 to 100% by mass, and is more preferably 85 to 100% by mass, even more preferably 90 to 100% by mass, relative to the total amount (100% by mass) of the silica particles.

The volume-average secondary particle diameter of the silica particles that are used in one embodiment of the present invention is, from the viewpoint of improving the air escape property and the blister resistance of the pressure sensitive adhesive sheet, and from the viewpoint of facilitating the formation of the one or more concave portions enabling the standard deviation ($\sigma$) based on the mean brightness value of the surface ($\alpha$) of the resin layer to fall within the above-described range, preferably 0.5 to 10 μm, more preferably 1 to 8 μm, even more preferably 1.5 to 5 μm.

In the present invention, the value of the volume-average secondary particle diameter of the silica particles is a value determined through measurement of particle size distribution according to a Coulter counter method using Multisizer III or the like.

Examples of the metal oxide particles include particles of a metal oxide selected from titanium oxide, alumina, boehmite, chromium oxide, nickel oxide, copper oxide, titanium oxide, zirconium oxide, indium oxide, zinc oxide, and composite oxides thereof, etc., and include sol particles of those metal oxides.

Examples of smectite include montmorillonite, beidellite, hectorite, saponite, stevensite, nontronite, sauconite, etc.

The mass retention rate after heating the resin layer that one embodiment of the pressure sensitive adhesive sheet of the present invention has, at 800° C. for 30 minutes is preferably 3 to 90% by mass, more preferably 5 to 80% by mass, even more preferably 7 to 70% by mass, still more preferably 9 to 60% by mass.

The mass retention rate can be considered to indicate the content (% by mass) of the fine particles contained in the resin layer.

When the mass retention rate is 3% by mass or more, the pressure sensitive adhesive sheet can be excellent in air escape property and blister resistance. In addition, in production of the pressure sensitive adhesive sheet of the present invention, one or more concave portions enabling the standard deviation ($\sigma$) based on the mean brightness value of the surface ($\alpha$) of the resin layer to fall within the above-described range can be readily formed. On the other hand, when the mass retention rate is 90% by mass or less, a pressure sensitive adhesive sheet can be provided in which the film strength of the resin layer is high and which is excellent in water resistance and chemical resistance.

[Production Method for Pressure Sensitive Adhesive Sheet]

A production method for the pressure sensitive adhesive sheet of the present invention is described below, The production method for the pressure sensitive adhesive sheet of the present invention is not specifically limited, but from the viewpoint of productivity and from the viewpoint of facilitating the formation of the concave portions enabling the standard deviation ($\sigma$) based on the mean brightness value of the surface ($\alpha$) of the resin layer to fall within the above-described range, a method having at least the following steps (1) and (2) is preferred.

Step (1): a step of for ruing a coating film (x') of a composition (x) containing the resin as a main component, and a coating film (y') of a composition (y) containing the fine particles in an amount of 15% by mass or more Step (2): a step of drying the coating film (x') and the coating film (y') formed in the step (1) simultaneously <Step (1)>

The step (1) is a step of forming a coating film (x') of a composition (x) containing the resin as a main component, and a coating film (y') of a composition (y) containing the fine particles in an amount of 15% by mass or more.

The composition (x) is a forming material for the resin part (X), and preferably contains a crosslinking agent along with the above-mentioned resin, and may further contain the above-mentioned ordinary additive.

The composition (y) is a forming material for the particle part (Y), and may contain a resin and a crosslinking agent, as well as the above-mentioned ordinary additive. The composition (y) containing those components of resin and others could also be a forming material for the resin part (X).

(Composition (x))

The resin contained in the composition (x) includes a resin that constitutes the above-mentioned resin part (X), and is preferably a pressure sensitive adhesive resin having a functional group, more preferably the above-mentioned functional group-having acrylic resin (A), and is preferably the above-mentioned acrylic copolymer (A1).

The content of the resin in the composition (x) is generally 40% by mass or more, and is preferably 50% by mass or more, more preferably 65% by mass or more, even more preferably 75% by mass or more, still more preferably 85% by mass or more, further more preferably 90% by mass or more, relative to the total amount (100% by mass (but excluding diluent solvent)) of the composition (x), and is preferably 100% by mass or less, more preferably 95% by mass or less, relative to the total amount (100% by mass (but excluding diluent solvent)) of the composition (x).

The crosslinking agent contained in the composition (x) includes the crosslinking agent contained in the above-mentioned resin part (X). Preferably, one or more selected from a metal chelate crosslinking agent and an epoxy crosslinking agent are contained, and more preferably a metal chelate crosslinking agent is contained.

Further, from the viewpoint of bettering the shape retentivity of the plural concave portions on the surface ($\alpha$) of the resin layer to be formed, it is desirable that the composition (x) contains both a metal chelate crosslinking agent and an epoxy crosslinking agent.

In the case where the composition (x) contains both a metal chelate crosslinking agent and an epoxy crosslinking agent, the content ratio by mass of the metal chelate crosslinking agent to the epoxy crosslinking agent in the composition (x) [metal chelate crosslinking agent/epoxy crosslinking agent] is preferably 10/90 to 99.5/0.5, more preferably 50/50 to 99.0/1.0, even more preferably 65/35 to 98.5/1.5, still more preferably 75/25 to 98.0/2.0.

The content of the crosslinking agent is preferably 0.01 to 15 parts by mass, and is more preferably 0.1 to 10 parts by mass, even more preferably 0.3 to 7.0 parts by mass, relative to 100 parts by mass of the resin contained in the composition (x).

Preferably, the composition (x) is an acrylic pressure sensitive adhesive containing the above-mentioned functional group-having acrylic resin (A) and crosslinking agent (B), more preferably an acrylic pressure sensitive adhesive containing the above-mentioned acrylic copolymer (A1) and crosslinking agent (B).

The details of the acrylic pressure sensitive adhesive are as mentioned above.

The composition (x) may contain the above-mentioned fine particles, in which the content of the fine particles is less than 15% by mass and is smaller than the content of the resin contained in the composition (x).

Specifically, the content of the fine particles is less than 15% by mass, and is preferably 0 to 13% by mass, more preferably 0 to 10% by mass, even more preferably 0 to 5% by mass, still more preferably 0% by mass, relative to the total amount (100% by mass (but excluding diluent solvent)) of composition (x).

(Composition (y))

The composition (y) is a forming material for the particle part (Y), and contains at least the above-mentioned fine particles in an amount of 15% by mass or more, but from the viewpoint of the dispersibility of the fine particles therein, the composition preferably contains a resin along with the fine particles, and more preferably further contains a crosslinking agent along with the rein. The composition (y) may contain any ordinary additive.

These resin, crosslinking agent and ordinary additive may be the forming material for the resin part (X).

The fine particles to be contained in the composition (y) include those mentioned hereinabove, and from the viewpoint of forming the void part (Z) in the resin layer to provide a pressure sensitive adhesive sheet having improved blister resistance, one or more kinds selected from silica particles, metal oxide particles and smectite are preferred.

The content of the fine particles in the composition (y) is, from the viewpoint of facilitating the formation of irregular concave portions on the surface (α) of the resin layer through self-formation of the resin layer, 15% by mass or more, and is preferably 20 to 100% by mass, more preferably 25 to 90% by mass, even more preferably 30 to 85% by mass, still more preferably 35 to 80% by mass, relative to the total amount (100% by mass (but excluding diluent solvent)) of the resin composition (y).

The resin to be contained in the composition (y) includes the same ones as those of the resin to be contained in the above-mentioned composition (x), and preferably contains the same resin as in the composition (x). One alone or two or more kinds of these resins may be used either singly or as combined.

More specifically, the resin to be contained in the composition (y) is preferably a resin having a functional group, more preferably the above-mentioned functional group-having acrylic resin (A), even more preferably the above-mentioned acrylic copolymer (A1).

The content of the resin in the composition (y) is generally 1 to 85% by mass, preferably 5 to 80% by mass, and is more preferably 10 to 75% by mass, even more preferably 20 to 70% by mass, further more preferably 25 to 65% by mass, relative to the total amount (100% by mass (but excluding diluent solvent)) of the composition (y).

The crosslinking agent to be contained in the composition (y) includes those of the crosslinking agent to be contained in the above-mentioned resin part (X), but preferably the composition (y) contains at least one or more selected from a metal chelate crosslinking agent and an epoxy crosslinking agent, more preferably a metal chelate crosslinking agent. Also preferably, the composition (y) contains both a metal chelate crosslinking agent and an epoxy crosslinking agent.

In the case where the composition (y) contains both a metal chelate crosslinking agent and an epoxy crosslinking agent, a preferred range of the content ratio (by mass) of the metal chelate crosslinking agent to the epoxy crosslinking agent in the composition (y) is the same as in the above-mentioned composition (x).

The content of the crosslinking agent is preferably 0.01 to 15 parts by mass, and is more preferably 0.1 to 10 parts by mass, even more preferably 0.3 to 7.0 parts by mass, relative to 100 parts by mass of the resin contained in the composition (y).

(Formation Method for Coating Film (x'), (y'))

For facilitating the formation of a coating film, it is desirable that a solvent is incorporated in the composition (x) or (y) to give a solution of the composition.

The solvent includes water, organic solvents, etc.

Examples of the organic solvent include toluene, ethyl acetate, butyl acetate, methyl ethyl ketone, methyl isobutyl ketone, methanol, ethanol, isopropyl alcohol, t-butanol, s-butanol, acetylacetone, cyclohexanone, n-hexane, cyclohexane, etc. One alone or two or more of these solvents may be used either singly or as combined.

The order of laminating the coating films (x') and (y') to be formed in this step is not specifically limited, but preferably, the coating film (x') is laminated on the coating film (y').

Regarding the formation method for the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, a die coater, etc.

Examples of the coater for use in simultaneous coating with a multilayer coater include a curtain coater, a die coater, etc., and among these, a die coater is preferred from the viewpoint of operability.

In this step (1), after the formation of at least one of the coating film (x') and the coating film (y') and prior to the step (2), pre-drying treatment may be carried out in such a degree that the curing reaction of the coating film could not go on.

The drying temperature in the pre-drying treatment in this step (1) is generally settled within a temperature range in which the formed coating film is not cured, but is preferably lower than the drying temperature in the step (2). A specific drying temperature indicated by the definition of indicating a range "lower than the drying temperature in the step (2)" is preferably 10 to 45° C., more preferably 10 to 34° C., even more preferably 15 to 30° C.

<Step (2)>

The step (2) is a step of drying the coating film (x') and the coating film (y') formed in the step (1) simultaneously.

In this step, the coating film (x') and the coating film (y') formed are dried simultaneously, whereby a resin layer containing the resin part (X) and the particle part (Y) is formed and in addition, plural concave portions are formed on the surface (α) of the resin layer.

The drying temperature in this step is, from the viewpoint of facilitating the formation of the one or more concave portions enabling the standard deviation (σ) based on the mean brightness value of the surface (α) of the resin layer to fall within the above-described range, preferably 35 to 200° C., more preferably 60 to 180° C., even more preferably 70 to 160° C., still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material that the pressure sensitive adhesive sheet has can be free from trouble of shrinkage thereof.

When the drying temperature is lower, the height difference of the concave portions to be formed could increase but the number of the concave portions to be formed tends to decrease.

In the vicinity of the particle part (Y) of the resin layer to be formed in this step, a void part (Z) may be formed.

The void part (Z) can be readily formed by using at least one or more kinds selected from silica particles, metal oxide particles and smectite as the fine particles to be contained in the composition (y).

In the case where a pressure sensitive adhesive sheet having a resin layer having a multilayer structure is produced in which the multilayer structure is formed by laminating a layer (Xβ) mainly containing the resin part (X), a layer (Y1) containing the particle part (Y) in an amount of 15% by mass or more, and a layer (Xα) mainly containing the resin part (X) in this order, like the pressure sensitive adhesive sheet 1a of FIG. 1(a), a production method of the following first and second embodiments is preferred.

In the description of the production method of the following first and second embodiments, the "composition (xβ) or (xα) containing a resin as a main component" is the same as the above-mentioned composition (x), and the details of the constituent components contained in the composition (xβ) or (xα) (kind of the component, preferred components, content of the component, etc.) are also the same as in the latter. The "composition (y) containing fine particles in an amount of 15% by mass or more" is also as mentioned above.

[Production Method of First Embodiment]

The production method of the first embodiment has at least the following steps (1A) and (2A).

Step (1A): a step of forming, on a substrate or a release material, a coating film (xβ') of a composition (xβ) containing a resin as a main component, a coating film (y') of a composition (y) containing fine particles in an amount of 15% by mass or more and a coating film (xα') of a composition (xα) containing a resin as a main component, as laminated thereon in this order Step (2A): a step of drying the coating film (xβ'), the coating film (y') and the coating film (xα') formed in the step (1A) simultaneously Also in the step (1A), it is desirable that the above-mentioned solvent is incorporated in the composition (xβ), the composition (y) and the composition (xα) to form solutions of the individual compositions, and the resultant solutions are used for coating.

Regarding the formation method for the coating film (xβ'), the coating film (y') and the coating film (xα'), there may be employed a successive formation method of forming a coating film (xα') on a substrate or a release material, then forming a coating film (y') on the coating film (xβ'), and further forming a coating film (xα') on the coating film (y'), using the above-mentioned coater, or a simultaneous coating method of forming a coating film (xβ'), a coating film (y') and a coating film (xα'), using the above-mentioned multi-layer coater.

In the step (1A), after formation of one or more coating films of the coating film (xβ'), the coating film (y') and the coating film (xα') and prior to the step (2A), pre-drying treatment may be carried out in such a degree that the curing reaction of the coating films could not go on.

For example, after formation of the coating film (xβ'), the coating film (y') and the coating film (xα'), such pre-drying treatment may be carried out every time after the formation, or after the formation of the coating film (xβ') and the coating film (y'), the two may be subjected to the pre-drying treatment all together, and then the coating film (xα') may be formed thereon.

In this step (1A), the drying temperature for the pre-drying treatment is generally so settled as to fall within a temperature range in which the formed coating film is not cured, but is preferably lower than the drying temperature in the step (2A). A specific drying temperature indicated by the definition of indicating a range "lower than the drying temperature in the step (2A)" is preferably 10 to 45° C., more preferably 10 to 34° C., even more preferably 15 to 30° C.

The step (2A) is a step of drying the coating film (xβ'), the coating (y') and the coating film (xα') formed in the step (1A), simultaneously. The preferred range of the drying temperature in this step is the same as that in the above-mentioned step (2). In this step, a resin layer containing the resin part (X) and the particle part (Y) is formed.

[Production Method of Second Embodiment]

The production method of the second embodiment has at least the following steps (1B) and (2B).

Step (1B): a step of forming, on a layer (Xβ) mainly containing a resin part (X) that is provided on a substrate or a release material, a coating film (y') of a composition (y) containing fine particles in an amount of 15% by mass or more and a coating film (xα') of a composition (xα) containing a resin as a main component, as laminated thereon in this order Step (2B): a step of drying the coating film (y') and the coating film (xα') formed in the step (1B) simultaneously In the step (1B), the "layer (Xβ) mainly containing a resin part (X)" is formed by drying the above-mentioned coating film (xβ') of a composition (xβ) containing a resin as a main component.

Since the layer (Xβ) is formed of the composition (xβ), the layer (Xβ) may contain a crosslinking agent, an ordinary additive and others in addition to the resin therein. The content of the resin part (X) in the layer (Xβ) is as described above.

Regarding the formation method for the layer (Xβ), a coating film (xβ') of a composition (xβ) containing a resin as a main component is formed on a substrate or a release material, and the coating film (xβ') is dried to form the layer.

The drying temperature at this time is not specifically limited, but is preferably 35 to 200° C., more preferably 60 to 180° C., even more preferably 70 to 160° C., still more preferably 80 to 140° C.

This embodiment differs from the above-mentioned first embodiment in that the coating film (y') and the coating film (xα') are formed in this order on the layer (Xβ) formed by drying, but not on the coating film (xβ').

Also in the step (1B), it is desirable that the above-mentioned solvent is incorporated in the composition (y) and the composition (xα) to form solutions of the respective compositions, and thereafter the solutions are used for coating.

Regarding the formation method for the coating film (y') and the coating film (xα'), there may be employed a successive formation method of forming a coating film (y') on the layer (Xβ) and then forming a coating film (xβ') on the coating film (y'), using the above-mentioned coater, or a simultaneous coating method of coating with both the coating film (y') and the coating film (xα') using a multilayer coater.

In the step (1B), after formation of the coating film (y') or after formation of the coating film (y') and the coating film (xα') and prior to the step (2B), pre-drying treatment may be carried out in such a degree that the curing reaction of the coating films could not go on.

In this step (1B), the drying temperature for the pre-drying treatment is generally so settled as to fall within a temperature range in which the formed coating film is not cured, but is preferably lower than the drying temperature in the step (2B). A specific drying temperature indicated by the definition of indicating a range "lower than the drying temperature in the step (2B)" is preferably 10 to 45° C., more preferably 10 to 34° C., even more preferably 15 to 30° C.

The step (2B) is a step of drying the coating film (y') and the coating film (xα') formed in the step (1B) simultaneously, and the preferred range of the drying temperature in this step is the same as in the above-mentioned step (2). In this step, a resin layer containing the resin part (X) and the particle part (Y) is formed.

(Viscoelastic Layer)

The present invention also provides a viscoelastic layer containing a resin and having one or more concave portions on at least one surface thereof, wherein the standard deviation (σ) based on the mean brightness value of the surface on which the concave portions exist is 10.0 or more.

In one embodiment of the present invention, the standard deviation (σ) based on the mean brightness value of the surface on which the concave portions exist is preferably 25.0 or more, more preferably 30.0, even more preferably 35.0 or more, still more preferably 40.0 or more, and is preferably 100.0 or less, more preferably 80.0 or less.

The viscoelastic layer of one embodiment of the present invention preferably contains a resin part (X) containing a resin as a main component and a particle part (Y) containing fine particles.

The kind and the content of the resin to constitute the viscoelastic layer, the kind and the content of the fine particles, the kind and the content of other components, and the constituent elements relating to the viscoelastic layer (layer configuration, elements relating to concave portions, thickness, forming material, production method, etc.) are the same as the constituent elements described hereinabove in the section of the resin layer.

However, the surface of the viscoelastic layer does not always need to have pressure sensitive adhesiveness. Accordingly, the resin to constitute the viscoelastic layer may be a non-pressure sensitive adhesive resin alone.

EXAMPLES

The present invention will be described more specifically with reference to the following examples, but the present invention is not limited to the following examples. The property values in the following examples and production examples are values measured by the following methods.

Mass Average Molecular Weight of Resin (Mw)

The measurement was performed by using a gel permeation chromatography instrument ("HLC-8020, a product name, produced by Tosoh Corporation) under the following conditions, and a value measured as the standard polystyrene conversion was used.

Measurement Condition

Column: "TSK guard column HXL-L", "TSK gel G2500HXL", "TSK gel G2000HXL", and "TSK gel G1000HXL" (all produced by Tosoh Corporation), connected in series Column temperature: 40° C.

Developing solvent: tetrahydrofuran

Flow rate: 1.0 mL/min

Measurement of Volume Average Secondary Particle Diameter of Silica Particles

The volume average secondary particle diameter of the silica particles was obtained by measuring the particle size distribution with Multisizer III (produced by Beckman Coulter Inc.) by the Coulter Counter method.

Measurement of Thickness of Resin Layer

The thickness of the resin layer was measured by observing the cross section of the resin layer of the target pressure sensitive adhesive sheet with a scanning electron microscope ("S-4700", a product name, produced by Hitachi, Ltd.).

Production Examples x-1 to x-3

Preparation of Solutions (x-1) to (x-3) of Resin Composition

To 100 parts by mass of the solution of an acrylic resin with the kind and the solid content shown in Table 1, a crosslinking agent and a diluting solvent with the kinds and the mixed amounts shown in Table 1 were added, so as to prepare solutions (x-1) to (x-3) of a resin composition having the solid contents shown in Table 1.

The details of the components shown in Table 1 used for the preparation of the solutions (x-1) to (x-3) of a resin composition are as follows.

Solution of Acrylic Resin

Solution (i): a mixed solution of toluene and ethyl acetate containing an acrylic resin (x-i) (an acrylic copolymer having structural units derived from butyl acrylate (BA) and acrylic acid (AA), BA/AA=90/10 (% by mass), Mw: 470,000) having a solid concentration of 33.6% by mass Solution (ii): a mixed solution of toluene and ethyl acetate containing an acrylic resin (x-ii) (an acrylic copolymer having structural units derived front butyl acrylate (BA), 2-ethylhexyl acrylate (2EHA), vinyl acetate (VAc), and acrylic acid (AA), BA/2EHA/VAc/AA=46/37/10/7 (% by mass), Mw: 370,000) having a solid concentration of 43.0% by mass Crosslinking Agent Aluminum chelate crosslinking agent: "M-5A", a product name, produced by Soken Chemical & Engineering Co., Ltd., solid concentration: 4.95% by mass Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass Diluting Solvent IPA: isopropyl alcohol mass) of silica particles ("Nipsil E-200A", a product name, produced by Tosoh Silica Corporation, volume average secondary particle diameter: 3 μm) and toluene were added, and the fine particles were dispersed, so as to prepare a fine particle dispersion liquid (y-0) having a solid concentration of 30% by mass containing the acrylic resin and the silica particles.

Production Examples y-1 to y-4

Preparation of Coating Liquids (y-1) to (y-4) for forming Coating film (y')

To the mixed amount shown in Table 2 of the fine particle dispersion liquid (y-0) produced in Production Example y-0, the kinds and the mixed amounts shown in Table 2 of the solution of an acrylic resin, the crosslinking agent, and the diluting solvent were added, so as to prepare coating liquids (y-1) to (y-4) for forming a coating film (y') having the solid concentrations shown in Table 2.

The details of the components shown in Table 2 used for the preparation of the coating liquids (y-1) to (y-4) for forming a coating film (y') are as follows.

Solution of Acrylic Resin

Solution (i): acrylic resin (x-i) (the details thereof are described above)

TABLE 1

| | Solution of resin composition | Kind | Solution of acrylic resin Kind of resin | Mixed amount (part by mass) | Mixed amount of solid content (part by mass) | Aluminum chelate crosslinking agent (M-5A, solid concentration: 4.95 wt %) | | | Epoxy crosslinking agent (TETRAD-C, solid concentration: 5 wt %) | | | Diluting solvent Kind | Solid concentration of solution of resin composition (% by mass) |
|---|---|---|---|---|---|---|---|---|---|---|---|---|---|
| | | | | | | Mixed amount (part by mass) | Solid content (part by mass) | Solid content per 100 parts by mass of acrylic resin (part by mass) | Mixed amount (part by mass) | Solid content (part by mass) | Solid content per 100 parts by mass of acrylic resin (part by mass) | | |
| Production Example x-1 | (x-1) | solution (i) | acrylic resin (x-i) (BA/AA = 90/10 (wt %), Mw: 470,000) | 100 | 33.6 | 5 | 0.25 | 0.74 | — | — | — | IPA | 28 |
| Production Example x-2 | (x-2) | solution (i) | acrylic resin (x-i) (BA/AA = 90/10 (wt %), Mw: 470,000) | 100 | 33.6 | — | — | — | — | — | — | IPA | 27 |
| Production Example x-3 | (x-3) | solution (ii) | Acrylic resin (x-ii) (BA/2EHA/VAc/AA = 46/37/10/7 (wt %), Mw: 370,000) | 100 | 43.0 | 4.5 | 0.22 | 0.52 | 0.3 | 0.015 | 0.035 | IPA | 34.4 |

Production Example y-0

Preparation of Fine Particle Dispersion Liquid (y-0)

To 100 parts by mass (solid content: 33.6 parts by mass) of the solution (i) containing the acrylic resin (x-i) (a mixed solution of toluene and ethyl acetate containing an acrylic copolymer having structural units derived from butyl acrylate (BA) and acrylic acid (AA) (BA/AA=90/10 (% by mass), Mw: 470,000) having a solid concentration of 33.6% by mass), 50.4 parts by mass (solid content: 50.4 parts by Crosslinking Agent Aluminum chelate crosslinking agent: "M-5A", a product name, produced by Soken Chemical &. Engineering Co., Ltd., solid concentration: 4.95% by mass Diluting Solvent IPA: isopropyl alcohol IPA/CHN: mixed solvent containing isopropyl alcohol (IPA) and cyclohexanone (CHN) (IPA/CHN=60/40 (mass ratio))

TABLE 2

| Coating Liquid for Formation of Coating Film (y') | Fine Particle Dispersion (y-0) Prepared in Production Example y-0 (solid concentration: 30 wt %) | | | Solution of Acrylic Resin | | | | Aluminum Chelate Crosslinking Agent (M-5A, solid concentration: 4.95 wt %) | | Solid Fraction relative to 100 parts by mass of acrylic resin (part by resin) | Diluent Solvent Kind | Solid Concentration of Coating Liquid (mass %) | Particle Concentration in Solid Content of Coating Liquid (**) (mass %) |
|---|---|---|---|---|---|---|---|---|---|---|---|---|---|
| | Added Amount (part by mass) | Solid Content Added Amount (part by mass) | Fine Particle Content (*) (part by mass) | Kind | Kind of Resin | Added Amount (part by mass) | Solid Content Added Amount (part by mass) | Added Amount (part by mass) | Solid Content Added Amount (part by mass) | | | | |
| Production Example y-1 | (y-1) 69.7 | 20.9 | 12.5 | Solution (i) | Acrylic Resin (x-i) [BA/AA = 90/10 (wt %), Mw = 470,000] | 30.3 | 10.2 | 5.52 | 0.27 | 1.47 | IPA | 27 | 40 |
| Production Example y-2 | (y-2) 61.6 | 18.5 | 11.1 | Solution (i) | Acrylic Resin (x-i) [BA/AA = 90/10 (wt %), Mw = 470,000] | 38.4 | 12.9 | 6.04 | 0.30 | 1.47 | IPA | 27 | 35 |
| Production Example y-3 | (y-3) 85.4 | 25.6 | 15.4 | Solution (i) | Acrylic Resin (x-i) [BA/AA = 90/10 (wt %), Mw = 470,000] | 14.6 | 4.9 | 4.51 | 0.22 | 1.47 | IPA | 27 | 50 |
| Production Example y-4 | (y-4) 71.0 | 21.3 | 12.8 | Solution (i) | Acrylic Resin (x-i) [BA/AA = 90/10 (wt %), Mw = 470,000] | 29.0 | 9.7 | 5.44 | 0.27 | 1.47 | IPA/CHN | 26 | 41 |

(*): This is a value calculated from [solid content added amount] × 50.4/(50.4 + 33.6).
(**): This is a value calculated from [fine particle content]/([solid content added amount in fine particle dispersion (y-0)] + [solid content added amount in acrylic resin] + [solid content added amount in aluminium chelate crosslinking agent]) × 100.

Examples 1 to 5

(1) Formation of Coating film

A polyethylene terephthalate (PET) film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to the thickness shown in Table 3 as the thickness of the coating film after coating (i.e., the thickness of the coating film in a non-dried state), so as to form a coating film (xβ').

Subsequently, on the coating film (xβ') thus formed, one of the coating liquids (y-1) to (y-3) for forming a coating film (y') of the kinds shown in Table 3 was coated with an applicator o the thickness shown in Table 3 as the total thickness after coating both the two layers, i.e., the coating film (xβ') and a coating film (y') (i.e., the total thickness of the two layers in a non-dried state), so as to form a coating film (y').

Then, on the coating film (y') thus formed, the solution (x-1) of a resin composition prepared in Production Example x-1 was coated with an applicator to the thickness shown in Table 3 as the total thickness after coating all the three layers, i.e., the coating film (xβ'), the coating film (y'), and a coating film (xα') the total thickness of the three layers in a non-dried state), so as to form a coating film (xα')

(2) Drying Treatment

The three layers of the coating film (xβ'), the coating film (y'), and the coating film (xα')were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 3.

Comparative Example 1

A pressure sensitive adhesive sheet with a substrate, having a resin layer containing only a resin part (X) having a thickness of 25 μm was produced in the same manner as in Example 1, except that the coating film (y') and the coating film (xα') in Example 1 were not formed, but on the aluminum vapor deposition layer of the PET film used as the substrate, the solution (x-1) of a resin composition prepared in Production Example x-1 was coated with a knife coater to a thickness of 25 μm after drying to form a coating film (xβ').

Comparative Example 2

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to form a coating film (xβ'), which was then dried at 100° C. for 2 minutes, so as to form a layer (Xβ) containing a resin part (X) having a thickness of 5 μm.

Separately from the above, on a release agent layer of a release film ("SP-PET381031", a product name, produced by Lintec Corporation, a PET film having a silicone release agent layer provided on one surface thereof, thickness: 38 μm), the coating liquid (y-1) for forming a coating film (y') prepared in Production Example y-1 was coated with an applicator to form a coated layer (y'), which was then dried at 100° C. for 2 minutes, so as to form a layer (Y1) containing a resin part (X) and a particle part (Y) having a thickness of 15 μm.

Further separately from the above, on a release agent layer of a release film of the same kind as above, the solution (x-1) of a resin composition prepared in Production Example x-1 was coated with an applicator to form a coating film (xα'), which was then dried at 100° C. for 2 minutes, so as to form a layer (Xα) containing a resin part (X) having a thickness of 5 μm.

Then, lamination was performed in such a mariner that the surface of the layer (Xβ) formed on the PET film as the substrate was attached to the exposed surface of the layer (Y1) thus formed. Furthermore, lamination was performed in such a manner that the surface of the layer (Y1) having been exposed by removing the release film on the layer (Y1) was attached to the exposed surface of the layer (Xα) thus formed.

According to the procedures, a pressure sensitive adhesive sheet with a substrate, having a resin layer containing a resin part (X) and a particle part (Y) having a thickness of 25 μm, containing the substrate having laminated in this order thereon the layer (Xβ), the layer (Y1), and the layer (Xα) was produced.

Example 6

On a release agent layer of a release film ("SP-PET381031", a product name, produced by Lintec Corporation, a PET film having a silicone release agent layer provided on one surface thereof, thickness: 38 μm) as a first release material, the solution (x-3) of a resin composition prepared in Production Example x-3, the coating liquid (y-4) for forming a coating film (y') prepared in Production Example y-4, and the solution (x-3) of a resin composition prepared in Production Example x-3 were simultaneously coated in this order with a multilayer die coater (width: 250 mm) at the flow rate and the coating speed shown in Table 4, so as to form a coating film (xβ'), a coating film (y'), and a coating film (xα') simultaneously in this order from the side of the release film.

Then, the three layers of the coating film (xβ'), the coating film (y'), and the coating film (xα') were simultaneously dried at a drying temperature of 100° C. for 2 minutes, so as to form a resin layer containing a resin part (X) and a particle part (Y) having the thickness shown in Table 4. Then, lamination was performed in such a manner that the surface (α) of the resin layer thus formed was attached to a surface of a release agent layer of a release film ("SP-PET386040", a product name, produced by Lintec Corporation) as a second release material, thereby producing a pressure sensitive adhesive sheet without a substrate.

Subsequently, after allowing to stand the pressure sensitive adhesive sheet without a substrate under an environment at 23° C. for one week, the first release material was removed, and lamination was performed in such a manner that the exposed surface (β) of the resin layer was attached to a surface of an aluminum vapor deposition layer of a PET film having an aluminum vapor deposition layer ("FNS MAT N50", a product name, produced by Lintec Corporation, thickness: 50 μm) as a substrate, thereby providing a pressure sensitive adhesive sheet with a substrate.

Example 7

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with a knife coater to form a coating film (xβ'), which was then dried at 100° C. for 2 minutes, so as to form a layer (Xβ) containing a resin part (X) having a thickness of 8 μm. Lamination was performed in such a manner that the surface of the layer (Xβ) thus formed was attached to a surface of a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated in this order with a multilayer die coater (width: 500 mm) at the flow rate and the coating speed shown in Table 4, so as to form a coating film (y') and a coating film (xα') simultaneously in this order from the side of the layer (Xβ).

Then, the two layers of the coating film (y') and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 4.

The resin layers of the pressure sensitive adhesive sheets produced in Examples and Comparative Examples were subjected to the measurements and the evaluations shown below. The results are shown in Tables 3 and 4.

<Standard Deviation (σ) based on Mean Brightness Value of Surface (α)>

In the pressure sensitive adhesive sheet produced in Examples and Comparative Examples, the standard deviation based on the mean brightness value of the surface (α) of the resin layer was calculated according to the following operations (i) to (iii).

Operation (i): Using an electron microscope (30 times, accelerating voltage: 10 kV), a photographic picture of the surface (α) of the resin layer of the pressure sensitive adhesive sheet was taken in a perspective view at a shooting angle of 30 degrees. With that, a region (S) surrounded by a square having an edge length of 3 mm was arbitrarily selected on the surface (α) of the image.

Operation (ii): On the square image in the region (S) defined in the operation (i), the brightness values at different positions along one diagonal line of the square were plotted to prepare a line profile. Based on the line profile, the mean brightness and the standard deviation (σ) based on the mean brightness were calculated.

Operation (iii): On the square image in the region (S) defined in the operation (i), line profiles were also prepared on the "other diagonal line" of the square and the "two straight lines passing through the intersection of the two diagonal lines and individually parallel to the vertical side and the horizontal side of the square", totaling 3 lines, like the operation (ii) and the mean brightness and the standard deviation (σ) based on the mean brightness were calculated. A mean value of the values of the standard deviation (σ) based on the mean brightness on the four straight lines is referred to as "standard deviation (σ) based on the mean brightness value of the surface (α)" of the resin layer of the pressure sensitive adhesive sheet, and shown in Table 3 and Table 4.

<Presence or Absence of one or more Irregular Concave Portions on Surface (α)>

Ten regions (R) each surrounded by a square having an edge length of 4 mm were arbitrarily selected on the surface (α) of the resin layer of the pressure sensitive adhesive sheet produced in Examples and Comparative Examples, and the shapes of the concave portions existing in each region (R) were observed visually and with a digital microscope (magnification: 50), in a planar view (and if desired, in a stereoscopic view) from the side of the surface (α) to thereby confirm the presence or absence of irregular concave portions.

According to the following criteria, the presence or absence of irregular concave portions on the surface (α) was evaluated.

A: In all the selected 10 regions, one or more irregular concave portions were confirmed.

B: In 1 to 9 regions of the selected 10 region, one or more irregular concave portions were confirmed.

C: In all the selected 10 regions, one or more irregular concave portions were not confirmed.

In the case where plural concave portions were confirmed in the selected 10 regions by the above-mentioned observation, the positions of the plural concave portions and the shapes of the one or more attached faces in the selected 10 regions were also confirmed.

<Formation of one or more Concave Portions on Surface (α)>

A specific region defined by the requirements on the surface (α) of the resin layer of the pressure sensitive adhesive sheet produced in Examples and Comparative Examples was checked for formation of one or more concave portions satisfying the following requirements (I) to (III), using a scanning electron microscope (trade name "S-4700", manufactured by Hitachi Limited, for the requirement (II), the magnification for observation was 30).

In Table 3 and Table 4, those judged to have one or more concave portions satisfying the requirements formed therein were given "A", and those not judged to have one or more concave portions satisfying the requirements were given "F".

Requirement (I): Plural concave portions having a maximum height difference of 0.5 μm or more exist n a region (P) surrounded by a square having an edge length of 5 mm hat is arbitrarily selected on the surface (α).

Requirement (II): Relative to the total number (100%) of plural concave portions having a maximum height difference of 0.5 μm or more existing inside a region (P) surrounded by a square having an edge length of 5 mm that is arbitrarily selected on the surface (α), the number of the concave portions that have shapes differing from each other is 95% or more (in the case of 100%, that is, in the case where all the concave portions inside the region (P) have shapes differing from each other, the tested sheets were given "A+" in the Tables.)

Requirement (III): One or more concave portions having a maximum height difference of 0.5 μm or more exist n a region (Q) surrounded by an arbitrarily selected square having an edge length of 1 mm on the surface (α).

In evaluation of the requirement (I), a largest value of the measured plural height differences of the concave portions is referred to as "maximum height difference" as shown in Table 3 and Table 4.

Mass Retention Rate of Resin Layer of Pressure Sensitive Adhesive Sheet

For Examples and Comparative Examples except for Example 6, the resin layer was formed according to the method of the Examples and Comparative Examples on the surface of the release agent layer of a release film ("SP-PET381031", a product name, produced by Lintec Corporation, a PET film having a silicone release agent layer provided on one surface thereof, thickness: 38 μm) instead of the substrate, and then the release film was removed, so as to provide a sole resin layer.

For Example 6, the two release films were removed from the pressure sensitive adhesive sheet without a substrate obtained in the course of the production, so as to provide a sole resin layer.

The resin layer before heating was measured for the mass thereof, and then heated to 800° C. for 30 minutes in a muffle furnace ("KDF-P90", a product name, produced by Denken Co., Ltd.). The resin layer after heating was measured for the mass thereof, and the mass retention rate of the resin layer was calculated by the following expression.

$$\text{mass retention rate of resin layer (\%)} = ((\text{mass of resin layer after heating})/(\text{mass of resin layer before heating})) \times 100$$

The pressure sensitive adhesive sheets produced in Examples and Comparative Examples were measured or evaluated for the "air escape property", the "blister resistance", and the "adhesive strength" according to the following methods. The results are shown in Tables 3 and 4.

Air Escape Property

The pressure sensitive adhesive sheet in a size of 50 mm in length and 50 mm in width was attached to a melamine-coated plate as an adherend in a manner forming air accumulation. The presence of absence of the air accumulation after press-attaching with a squeegee was observed, and the air escape property of the pressure sensitive adhesive sheets was evaluated based on the following standard.

A: The air accumulation disappeared, and excellent air escape property was obtained.

F: The air accumulation remained, and poor air escape property was obtained.

Blister Resistance

The pressure sensitive adhesive sheet in a size of 50 mm in length and 50 mm in width was attached to a polymethyl methacrylate plate having a size of 70 mm in length, 150 mm in width, and 2 mm in thickness ("Acrylite L001", produced by Mitsubishi Rayon Co., Ltd.), followed by press-attaching with a squeegee, so as to provide a test specimen.

The test specimen was allowed to stand at 23° C. for 12 hours, then allowed to stand in a hot air dryer at 80° C. for 1.5 hours, further allowed to stand in a hot air dryer at 90° C. for 1.5 hours, and then visible to the naked eyes for the occurrence state of blister after the heat acceleration, and the blister resistance of the pressure sensitive adhesive sheets was evaluated based on the following standard.
A: Completely no blister was observed.
B: Blister was partially observed.
C: Blister was observed over the surface.

Adhesive Strength

The pressure sensitive adhesive sheets produced in Examples and Comparative Examples were cut into a size of 25 mm in length and 300 mm in width, and the surface ($\alpha$) of the resin layer of the pressure sensitive adhesive sheets was attached to a stainless steel plate (SUS304, polished with #360 polishing paper) under an environment of 23° C., 50% RH (relative humidity), followed by allowing to stand in the same environment for 24 hours. After standing, the adhesive strength of the pressure sensitive adhesive sheets was measured according to JIS Z0237:2000 by the 180° peeling method at a peeling speed of 300 mm/min.

TABLE 3

| | Thickness of coating film (μm) | | | Coating film (x$\beta$') Kind of solution | Kind of coating liquid | Coating film (y') Fine particle concentration in coating film (y') (mass %) | Coating film (x$\alpha$') Kind of solution | Resin layer Standard deviation based on mean brightness value of surface ($\alpha$) | Total thickness of resin layer (μm) |
|---|---|---|---|---|---|---|---|---|---|
| | Coating film (x$\beta$') | Coating film (x$\beta$' + y') | Coating film (x$\beta$' + y' + x$\alpha$') | | | | | | |
| Example 1 | 25 | 75 | 100 | (x-1) | (y-1) | 40 | (x-1) | 43.57 | 25.7 |
| Example 2 | 12.5 | 75 | 100 | (x-1) | (y-1) | 40 | (x-1) | 46.80 | 25.1 |
| Example 3 | 25 | 50 | 100 | (x-1) | (y-1) | 40 | (x-1) | 35.40 | 23.9 |
| Example 4 | 25 | 75 | 100 | (x-1) | (y-2) | 35 | (x-1) | 48.70 | 23.8 |
| Example 5 | 25 | 75 | 100 | (x-1) | (y-3) | 50 | (x-1) | 45.20 | 32.3 |
| Comparative Example 1 | 25(*2) | — | — | (x-1) | — | 0 | — | 4.01 | 25.0 |
| Comparative Example 2 | 5(*2) | 20(*2) | 25(*2) | (x-1) | (y-1) | 40 | (x-1) | 3.83 | 25.0 |

| | Resin layer | | | | | | Pressure sensitive adhesive sheet evaluation items | | |
|---|---|---|---|---|---|---|---|---|---|
| | Presence or absence of irregular concave portions on surface ($\alpha$) | Shapes of one or more concave portions on surface ($\alpha$) | | | Maximum height difference (μm) | Mass retention rate of resin layer (mass %) | Air escape property | Blister resistance | Adhesive strength (N/ 25 mm) |
| | | Requirement (I) | Requirement (II) | Requirement (III) | | | | | |
| Example 1 | A | A | A+ | A | 15.7 | 16.9 | A | A | 8.6 |
| Example 2 | A | A | A+ | A | 17.3 | 20.0 | A | A | 12.7 |
| Example 3 | A | A | A+ | A | 7.6 | 9.5 | A | A | 11.7 |
| Example 4 | A | A | A+ | A | 6.6 | 15.0 | A | A | 9.4 |
| Example 5 | A | A | A+ | A | 30.8 | 23.1 | A | A | 10.8 |
| Comparative Example 1 | C | F | — (*3) | F | 0 | 0.0 | F | C | 18.0 |
| Comparative Example 2 | C | F | — (*3) | F | 0 | 17.0 | F | A | 15.0 |

(*1): This is not a measured value but the thickness of the coating film preset in the multilayer die coater.
(*2) This is the thickness of the coating film after dried.
(*3): No concave portion was formed on the surface ($\alpha$), and the sample was not evaluated.

TABLE 4

| | Coating speed (m/min) | Flow rate of solution (coating liquid) (g/min) | | | Coating film (x$\beta$') Kind of solution | Kind of coating liquid | Coating film (y') Fine particle concentration in coating film (y') (mass %) | Coating film (x$\alpha$') Kind of solution | Resin layer Standard deviation based on mean brightness value of surface ($\alpha$) | Total thickness of resin layer (μm) |
|---|---|---|---|---|---|---|---|---|---|---|
| | | Coating film (x$\beta$') | Coating film (y') | Coating film (x$\alpha$') | | | | | | |
| Example 6 | 3.0 | 27 | 51 | 54 | (x-3) | (y-4) | 41 | (x-3) | 39.52 | 51.0 |
| Example 7 | 5.0 | (8 μm) (*4) | 133 | 161 | (x-1) | (y-1) | 40 | (x-1) | 39.52 | 42.0 |

TABLE 4-continued

| | Resin layer | | | | | Pressure sensitive adhesive sheet evaluation items | | |
| --- | --- | --- | --- | --- | --- | --- | --- | --- |
| | Presence or absence of | Shapes of one or more concave portions on surface (α) | | | Mass retention | | | |
| | irregular concave portions on surface (α) | Requirement (I) | Requirement (II) | Requirement (III) | Maximum height difference (μm) | rate of resin layer (mass %) | Air escape property | Blister resistance | Adhesive strength (N/ 25 mm) |
| Example 6 | A | A | A+ | A | 41.0 | 12.6 | A | A | 24.0 |
| Example 7 | A | A | A+ | A | 18.5 | 15.1 | A | A | 10.2 |

(*4): This is the thickness of the coating film (xβ') after dried.

From Table 3 and Table 4, it is confirmed that the pressure sensitive adhesive sheets produced in Examples 1 to 7 all had concave portions existing on the surface (α), and the standard deviation (σ) based on the mean brightness value of the surface (α) was 10.0 or more, and these pressure sensitive adhesive sheets all had good air escape property, blister resistance and adhesive strength.

In Examples 1 to 7, in the 10 regions selected in confirmation of "presence or absence of irregular concave portions on the surface (α)", the positions of the plural concave portions, and the shapes of the one or more attached faces were also checked, and the positions of the plural concave portions did not have periodicity and the shapes of the one or more attached faces had irregular shapes.

In addition, it was confirmed that, in all the pressure sensitive adhesive sheets produced in Examples 1 to 7, one or more concave portions existing in the region (Q) on the surface (α) of the resin layer extended toward any side of a square having an edge length of 1 mm, which is a boundary line of the region (Q), and further extended continuously in the other region (Q') surrounded by a square having an edge length of 1 mm, which is adjacent o the region (Q). This can be formed also from the oblique image of the surface (α) of the resin layer in FIG. 4(b).

Figure 4:
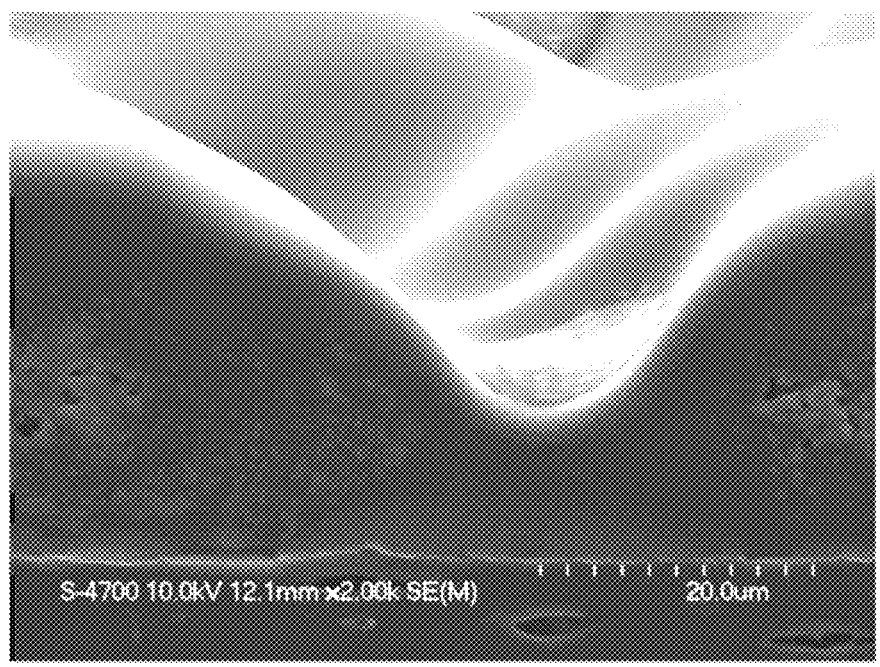
FIG. 4 is images obtained by observing the pressure sensitive adhesive sheet produced in Example 1 with a scanning electron microscope, in which (a) of FIG. 4 is a cross sectional image of the pressure sensitive adhesive sheet, and (b) of FIG. 4 is a perspective image of the surface (α) of the resin layer of the pressure sensitive adhesive sheet.
Figure 4:
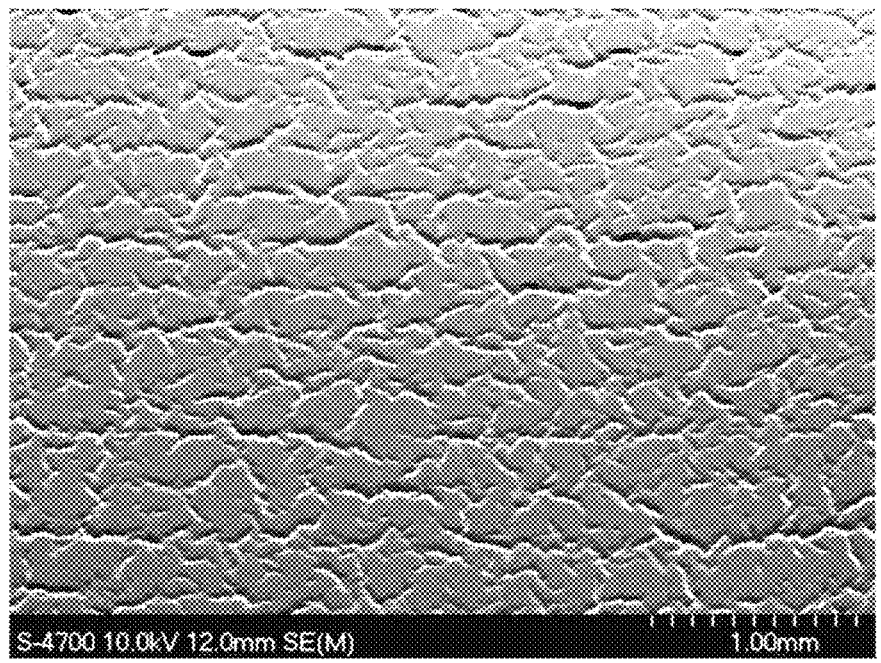

FIG. 4 includes images of the pressure sensitive adhesive sheet produced in Example 1, taken through a scanning electron microscope; and (a) is an image of a cross section of the pressure sensitive adhesive sheet, and (b) is a perspective image of the surface (α) of the resin layer of the pressure sensitive adhesive sheet. In the image of FIG. 4 (a), 10 scale marks given at the bottom right of the image indicate a length of 20.0 μm, and in the image of FIG. 4(b), 10 scale marks given at the bottom right of the image indicate a length of 1.00 mm.

From the images of FIG. 4, it is known that plural concave portions having irregular shapes exist on the surface (α) of the resin layer of the pressure sensitive adhesive sheet produced in Example 1, and the positions of the plural concave portions do not have periodicity. In addition, it is also known that the shapes of the one or more attached faces on the surface (α) also has an irregular shape, The images of FIG. 4 show the shapes of the concave portions existing on the surface (α) of the resin layer of the pressure sensitive adhesive sheet produced in Example 1, and the cross-sectional profiles of the concave portions of the pressure sensitive adhesive sheets of other Examples and the shapes of the concave portions observed from the side of the surface (α) of the resin layer thereof and the shapes of the one or more attached faces were all the same as in the images shown in FIG. 4.

On the other hand, formation of any specific concave portions could not be recognized on the surface of the resin layer that the pressure sensitive adhesive sheet produced in Comparative Examples 1 and 2 has, and the air escape property of these pressure sensitive adhesive sheets was poor. In addition, the pressure sensitive adhesive sheet of Comparative Example 1 was also poor in blister resistance.

Figure 5:
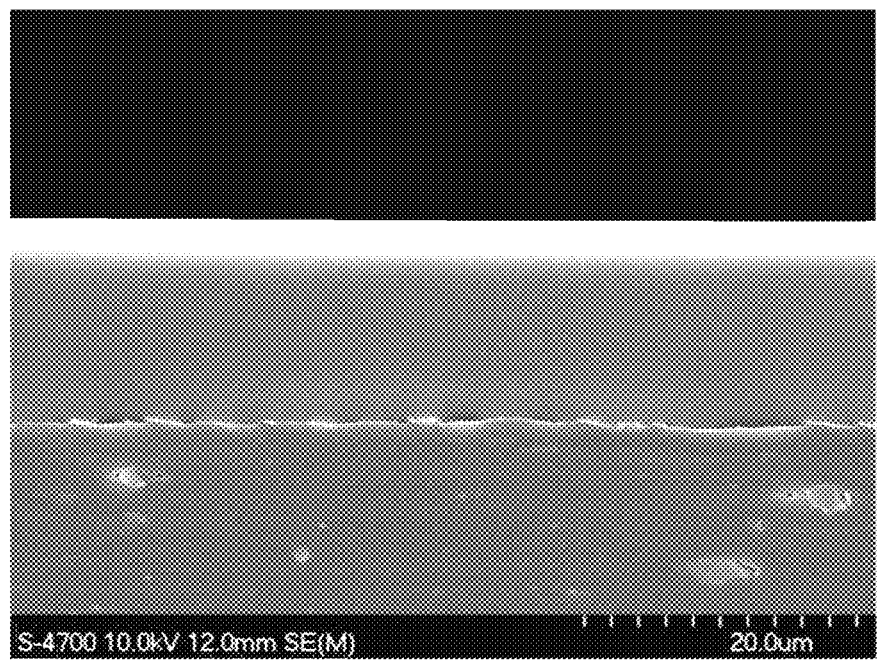
FIG. 5 is images obtained by observing the pressure sensitive adhesive sheet produced in Example 1 with a scanning electron microscope, in which (a) of FIG. 5 is a cross sectional image of the pressure sensitive adhesive sheet, and (b) of FIG. 5 is a perspective image of the surface (α) of the resin layer of the pressure sensitive adhesive sheet.
Figure 5:
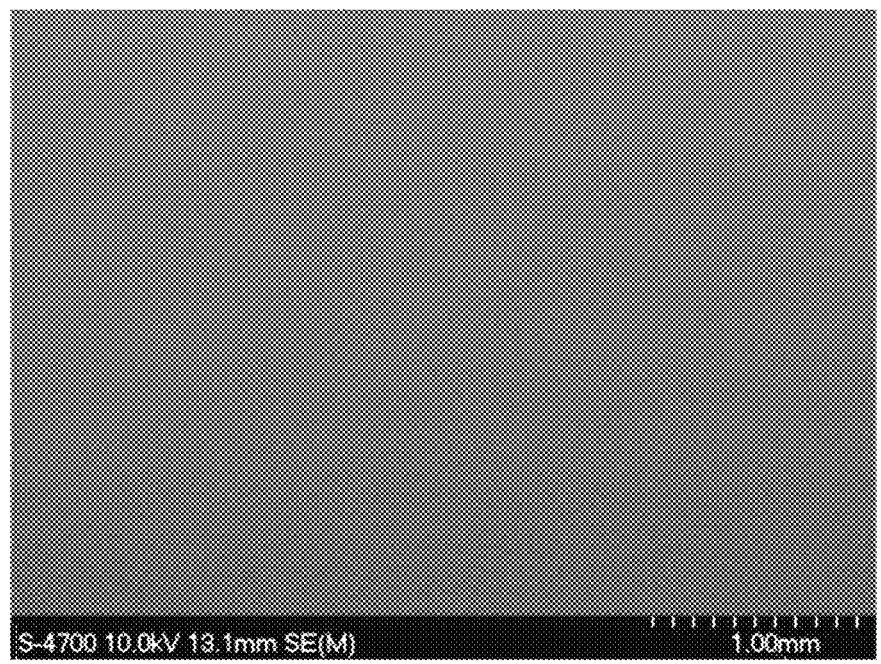

FIG. 5 includes images of the pressure sensitive adhesive sheet produced in Comparative Example 1, taken through a scanning electron microscope; and (a) is an image of a cross section of the pressure sensitive adhesive sheet, and (b) is a perspective image of the surface (α) of the resin layer of the pressure sensitive adhesive sheet. In the image of FIG. 5(a), 10 scale marks given at the bottom right of the image indicate a length of 20.0 μm, and in the image of FIG. 5(b), 10 scale marks given at the bottom right of the image indicate a length of 1.00 mm.

As shown in FIG. 5, formation of one or more concave portions was not seen on the surface (α) of the resin layer of the pressure sensitive adhesive sheet produced in Comparative Example 1.

Figure 6:
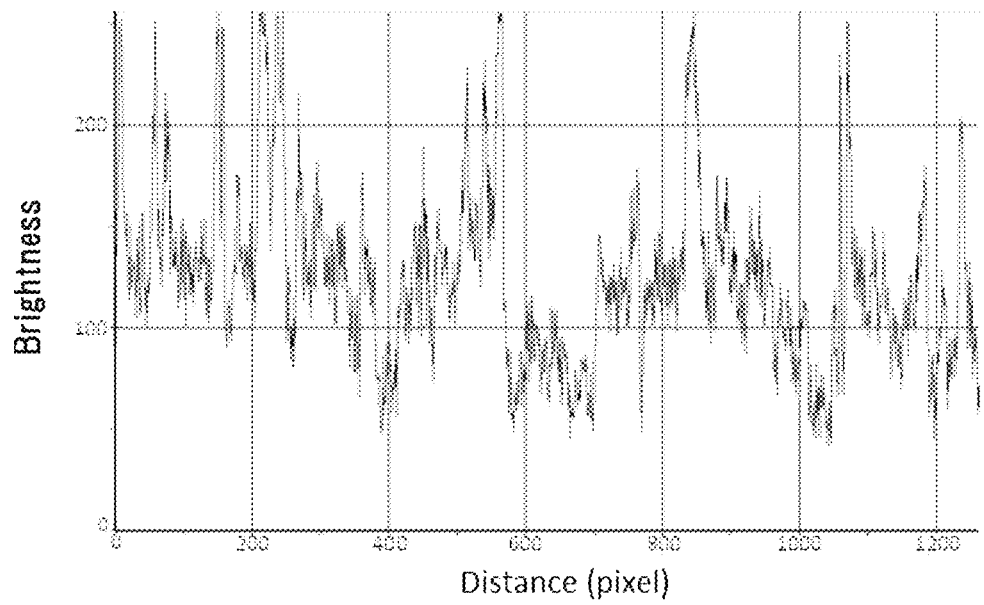
FIG. 6 is a graph showing one example of a line profile obtained by plotting the brightness value at each position on an arbitrarily selected straight line relative to the image, as taken through a scanning electron microscope, of the surface (α) of the resin layer of the pressure sensitive adhesive sheet produced in Example 1.
Figure 7:
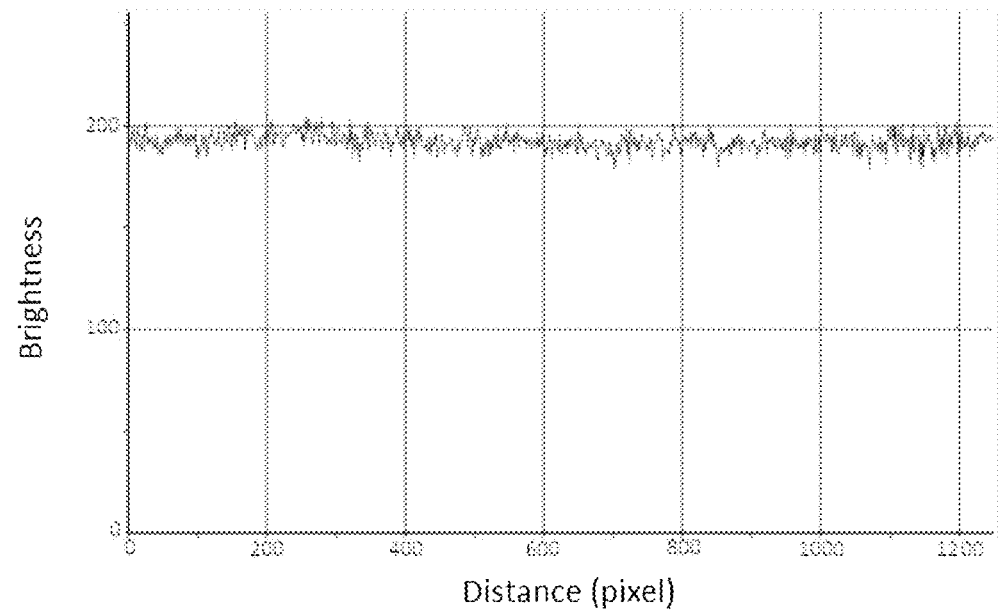
FIG. 7 is a graph showing one example of a line profile obtained by plotting the brightness value at each position on an arbitrarily selected straight line relative to the image, as taken through a scanning electron microscope, of the surface (α) of the resin layer of the pressure sensitive adhesive sheet produced in Comparative Example 1.

FIG. 6 is a graph showing one example of a line profile obtained by plotting the brightness value at each position on an arbitrarily selected straight line relative to the image, as taken through a scanning electron microscope, of the surface (α) of the resin layer of the pressure sensitive adhesive sheet produced in Example 1, and FIG. 7 is a graph showing such a line profile of the surface (α) of the resin layer of the pressure sensitive adhesive sheet produced in Comparative Example 1.

The line profiles shown in FIG. 6 and FIG. 7 are compared with each other, and it is known that the fluctuation of the brightness value on the straight line selected on the surface (α) is larger in Example 1 than in Comparative Example 1.

INDUSTRIAL APPLICABILITY

One embodiment of the pressure sensitive adhesive sheet of the present invention is useful as a pressure sensitive adhesive sheet having a large adhesive area that is used for identification or decoration, for masking in coating, and for surface protection for metal plates, etc.

REFERENCE SIGN LIST 1a, 1b, 2a, 2b Pressure Sensitive Adhesive Sheet
11 Substrate
12 Resin Layer
12a Surface (α)
12b Surface (β)
(X) Resin Part (X)
(Y) Particle Part (Y)
(Xβ) Layer (Xβ) mainly containing the resin part (X)
(Xα) Layer (Xα) mainly containing the resin part (X)
(Y1) Layer (Y1) containing the particle-part (Y) in an amount of 15% by mass or more 13, 130, 131, 132 Concave portions
13a Cross Line
14, 14a Release Material
50, 501, 502, 503, 504 Square having an edge length of 1 mm

The invention claimed is:

1. A pressure sensitive adhesive sheet, comprising:
a resin layer having a surface (α) and a surface (β) on an opposite side with respect to the surface (α); and
a substrate or a release material provided on the surface (β) of the resin layer,
wherein the resin layer comprises a resin and fine particles having a mean particle size of 0.01 to 100 μm,
the fine particles comprise at least one selected from the group consisting of silica particles, metal oxide particles, and smectite particles, wherein the silica particles comprise silica in an amount of 85 to 100% by mass relative to a total amount of the silica particles,
the surface (α) of the resin layer has pressure sensitive adhesiveness and has at least one concave portion, and
a standard deviation (σ) based on a mean brightness value of the surface (α) is 10.0 or more.

2. The pressure sensitive adhesive sheet according to claim 1, wherein the at least one concave portion is not formed by transferring an emboss pattern.

3. The pressure sensitive adhesive sheet according to claim 1, wherein the at least one concave portion has irregular shapes.

4. The pressure sensitive adhesive sheet according to claim 1, wherein the at least one concave portion is formed through self-formation of the resin layer.

5. The pressure sensitive adhesive sheet according to claim 1, wherein the at least one concave portion has a maximum height difference of 0.5 μm or more.

6. The pressure sensitive adhesive sheet according to claim 1, wherein the at least one concave portion is formed such that a 1 mm×1 mm square region (Q) arbitrarily selected on the surface (α) includes one or more of the at least one concave portion.

7. The pressure sensitive adhesive sheet according to claim 1, wherein the at least one concave portion includes a plurality of concave portions, and 95% or more of the concave portions have different shapes.

8. The pressure sensitive adhesive sheet according to claim 1, wherein the at least one concave portion includes a plurality of concave portions, and positions of the concave portions do not have periodicity.

9. The pressure sensitive adhesive sheet according to claim 1, wherein the resin layer comprises a resin part (X) comprising the resin as a main component and a particle part (Y) comprising the fine particles.

10. The pressure sensitive adhesive sheet according to claim 9, wherein the resin layer comprises 3 to 90% by mass of the fine particles.

11. The pressure sensitive adhesive sheet according to claim 9, wherein the fine particles are the silica particles.

12. The pressure sensitive adhesive sheet according to claim 1, wherein the resin layer comprises a layer (Xα) mainly comprising the resin,
a layer (Xβ) mainly comprising the resin, and
a layer (Y1) positioned between the layers (Xα) and (Xβ) and comprising the fine particles in an amount of 15% by mass or more.

13. The pressure sensitive adhesive sheet according to claim 12, wherein the layers (Xα) and (Xβ) have different compositions.

14. The pressure sensitive adhesive sheet according to claim 1, comprising the substrate provided on the surface (β) of the resin layer.

15. The pressure sensitive adhesive sheet according to claim 1, comprising the release material provided on the surface (β) of the resin layer.

16. The pressure sensitive adhesive sheet according to claim 1, wherein the resin layer further comprises a void.

17. The pressure sensitive adhesive sheet according to claim 1, wherein the resin layer has a thickness of 10 to 75 μm.

18. The pressure sensitive adhesive sheet according to claim 1, wherein the standard deviation (σ) based on a mean brightness value of the surface (α) is 25.0 to 80.0.

19. A viscoelastic layer, comprising:
a resin; and
fine particles having a mean particle size of 0.01 to 100 μm and comprising at least one selected from the group consisting of silica particles, metal oxide particles, and smectite particles, wherein the silica particles comprise silica in an amount of 85 to 100% by mass relative to a total amount of the silica particles,
wherein the viscoelastic layer has at least one surface having at least one concave portion, and
a standard deviation (σ) based on a mean brightness value of the surface having the at least one concave portion is 10.0 or more.

20. The viscoelastic layer according to claim 19, wherein the viscoelastic layer comprises a resin part (X) comprising the resin as a main component and a particle part (Y) comprising the fine particles.

* * * * *